(12) United States Patent
Nakayama et al.

(10) Patent No.: US 12,142,081 B2
(45) Date of Patent: Nov. 12, 2024

(54) WORK ESTIMATION APPARATUS, METHOD AND NON-TRANSITORY COMPUTER-READABLE STORAGE MEDIUM

(71) Applicant: KABUSHIKI KAISHA TOSHIBA, Tokyo (JP)

(72) Inventors: Shojun Nakayama, Yokohama Kanagawa (JP); Yojiro Tonouchi, Inagi Tokyo (JP); Uihyun Kim, Kawasaki Kanagawa (JP); Toshiaki Nakasu, Chofu Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 264 days.

(21) Appl. No.: 17/187,056

(22) Filed: Feb. 26, 2021

(65) Prior Publication Data

US 2022/0083769 A1    Mar. 17, 2022

(30) Foreign Application Priority Data

Sep. 14, 2020  (JP) ................. 2020-154120

(51) Int. Cl.
*G06V 40/20* (2022.01)
*G06T 7/73* (2017.01)
*G06V 20/10* (2022.01)
*G06V 40/10* (2022.01)

(52) U.S. Cl.
CPC ............. *G06V 40/23* (2022.01); *G06T 7/73* (2017.01); *G06V 20/10* (2022.01); *G06V 40/103* (2022.01); *G06T 2207/30196* (2013.01)

(58) Field of Classification Search
None
See application file for complete search history.

(56) References Cited

U.S. PATENT DOCUMENTS

| | | |
|---|---|---|
| 2003/0133614 A1 | 7/2003 | Robins et al. |
| 2011/0208558 A1* | 8/2011 | Wakita ........... G06Q 10/063114 705/7.15 |
| 2019/0026682 A1* | 1/2019 | Ike ................... G06Q 10/06398 |
| 2021/0166180 A1* | 6/2021 | Matsunaga ............... G06T 7/70 |
| 2022/0082462 A1* | 3/2022 | Sakuragi ............... A61B 5/1113 |

(Continued)

FOREIGN PATENT DOCUMENTS

| | | |
|---|---|---|
| JP | 2001/101422 A | 4/2001 |
| JP | 2003/235034 A | 8/2003 |
| JP | 2010/287145 A | 12/2010 |

(Continued)

OTHER PUBLICATIONS

Automatic Tracking Drone for Video Analysis of Moving People in Wide Area. Yamashita et al. (Year: 2020).*

(Continued)

*Primary Examiner* — Delomia L Gilliard
(74) *Attorney, Agent, or Firm* — Knobbe, Martens, Olson & Bear, LLP

(57) ABSTRACT

According to one embodiment, a work estimation apparatus includes processing circuitry. The processing circuitry acquires video data on a predetermined area, calculates a work value related to work performed by a worker included in the video data, based on the video data, and displays the work value.

18 Claims, 30 Drawing Sheets

(56) References Cited

U.S. PATENT DOCUMENTS

| | | | | |
|---|---|---|---|---|
| 2022/0083769 A1* | 3/2022 | Nakayama | ................ | G06T 7/73 |
| 2023/0039454 A1* | 2/2023 | Wang | ................ | G05B 19/4063 |

FOREIGN PATENT DOCUMENTS

| | | | | | |
|---|---|---|---|---|---|
| JP | 2017068428 A | * | 4/2017 | | |
| JP | 2018/018316 A | | 2/2018 | | |
| JP | 2018-139052 | | 9/2018 | | |
| JP | 2020-024688 | | 2/2020 | | |
| WO | WO-2018087844 A1 | * | 5/2018 | ........... | G05B 19/418 |
| WO | WO-2021131552 A1 | * | 7/2021 | ....... | G06Q 10/06395 |

OTHER PUBLICATIONS

German Intelligence Research Center, Hitachi, Ltd., "German Intelligence Research Center and Hitachi jointly developed AI that recognizes the work contents of wearable device wearers," German Intelligence Research Center, Hitachi Ltd, Mar. 8, 2017, http://www.hitachi.co.jp/New/cnews/month/2017/03/0308, in 4 pages.

German Intelligence Research Center, Hitachi, Ltd., German Intelligence Research Center, "Developed AI that quantitively evaluates the physical load of workers with a suit-type wearable device and presents improvements in work movements," German Intelligence Research Center, Hitachi Ltd, Mar. 20, 2019, https://www.hitachi.com.jp/New/cnews/month/2019/03/0320, in 4 pages.

J. Martinez et al, "A simple yet effective baseline for 3d human pose estimation," University of British Columbia, Body Labs Inc., https://arxiv.org/abs/1705.03098, Aug. 4, 2017, Vancouver Canada, in 10 pages.

S. Yan et al., "Spatial Temporal Graph Convolutional Networks for Skeleton-Based Action Recognition," Department of Information Engineering, https://arxiv.org/abs/1812.08008, Jan. 25, 2018, in 10 pages.

"OWAS: Ovako type work posture analysis system," http://www.nrec.sakura.ne.ip/OWAS.htm, (accessed Dec. 14, 2020), in 7 pages.

Z. Cao et al., "OpenPose: Realtime Multi-Person 2D Pose Estimation using Part Affinity Fields," IEEE Transactions on Pattern Ananlysis and Machine Intelligence, https://arxiv.org/abs/1812.08008 (May 30, 2019), in 14 pages.

Yamashita, H., et al. "Automatic Tracking Drone for Video Analysis of Moving People in Wide Area." Information Processing Society of Japan (IPSJ) SIG Technical Report, vol. 2020-CVIM-222 No. 38, May 5, 2020.

\* cited by examiner

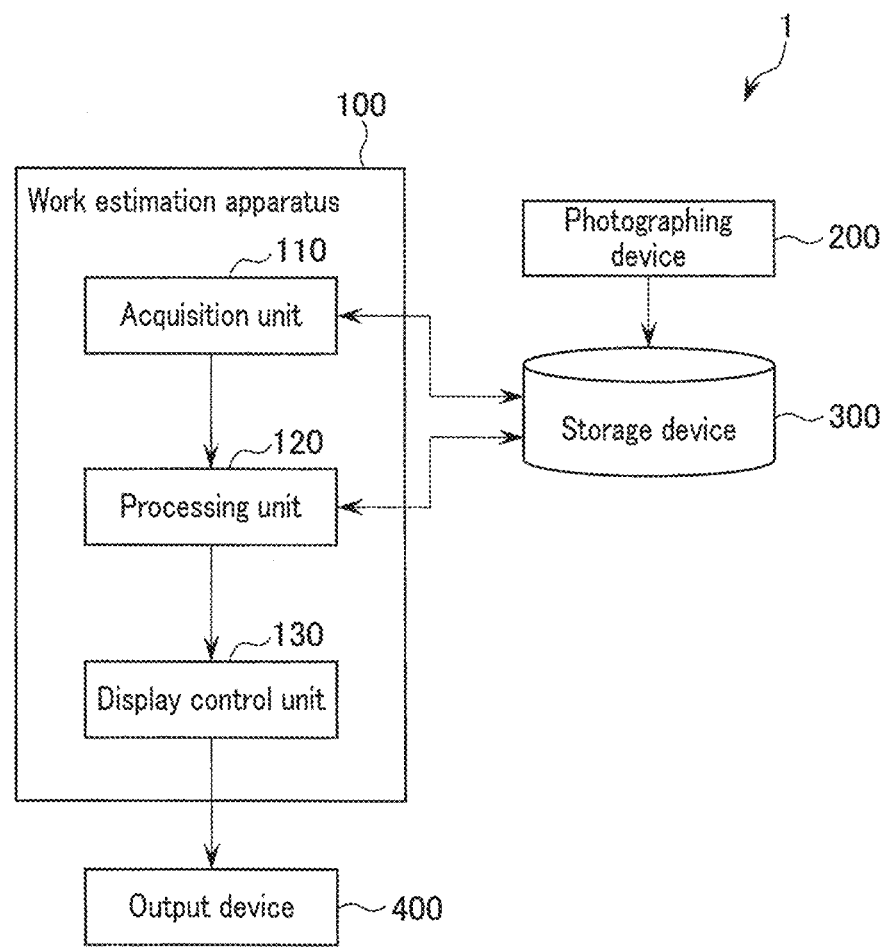
F I G. 1

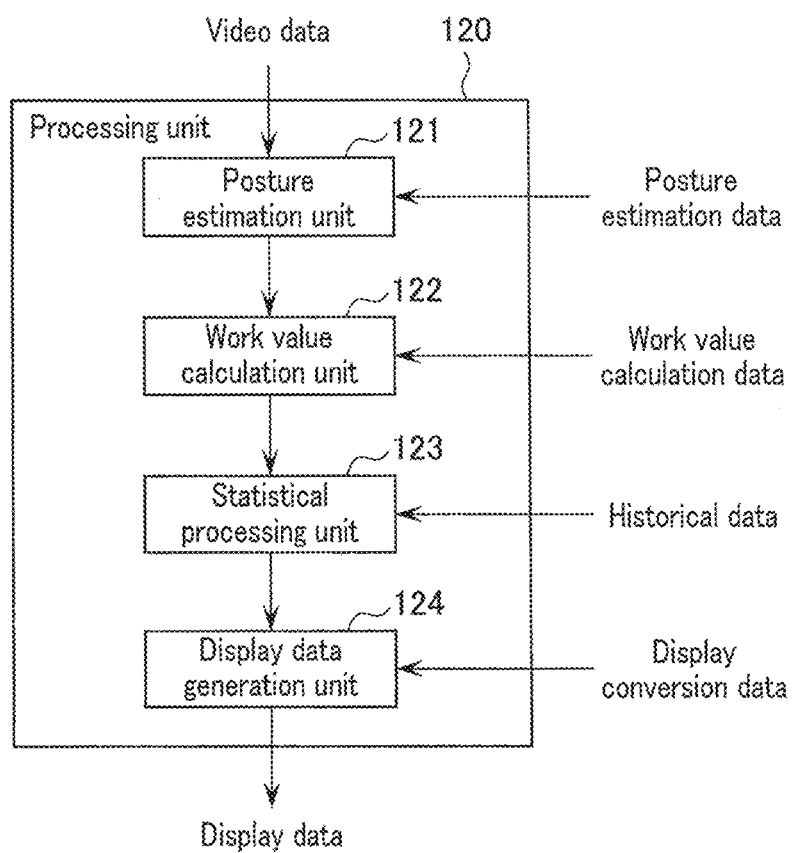
F I G. 2

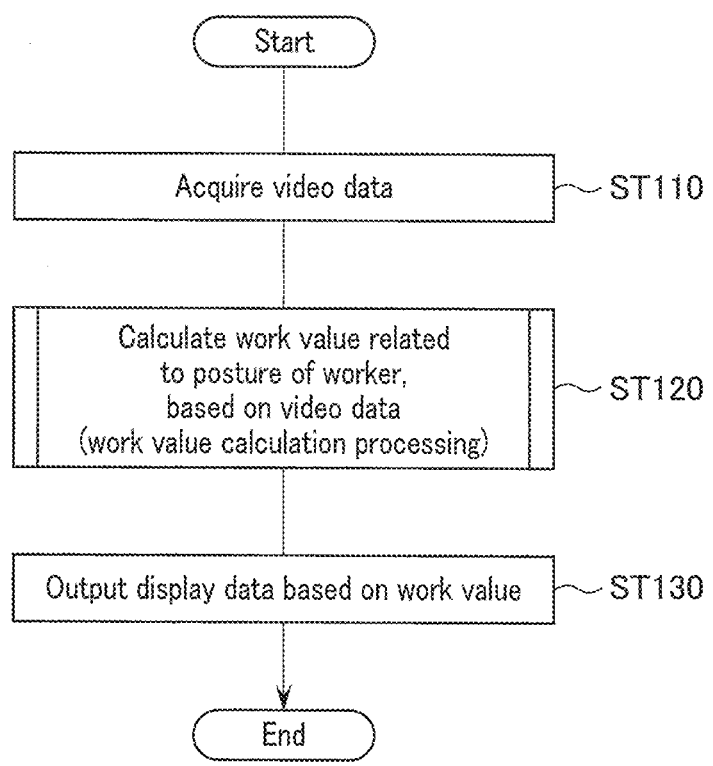
F I G. 3

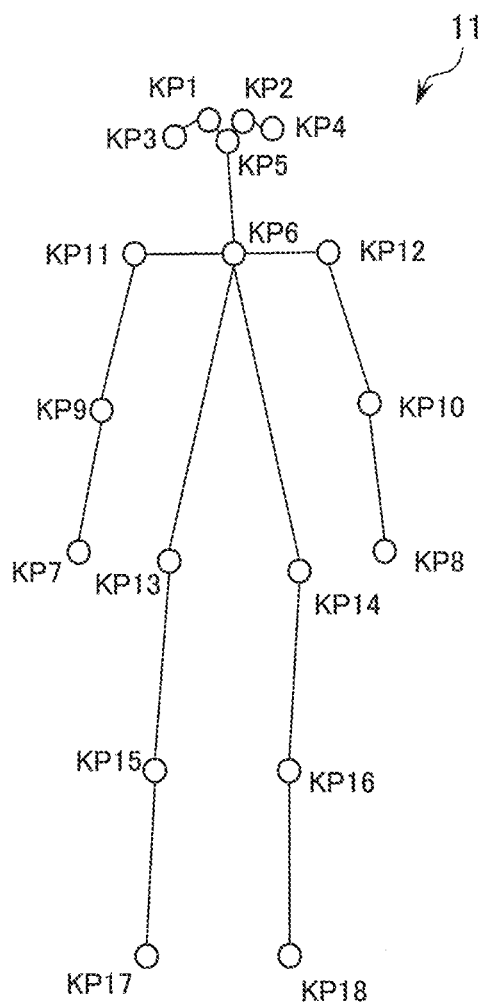
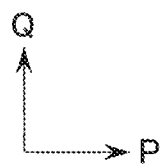
FIG. 5

| Body part | State classification symbol | State |
|---|---|---|
| Back | B1 | Straight |
| | B2 | Bent forward or backward |
| | B3 | Twisted or bent sideways |
| | B4 | Twisted and bent sideways, or bent diagonally forward |
| Upper limbs | U1 | Both arms are below shoulder |
| | U2 | One arm is at shoulder height or above |
| | U3 | Both arms are at shoulder height or above |
| Lower limbs | L1 | Sitting |
| | L2 | Standing with both legs straight |
| | L3 | Standing with one leg with center of gravity straight |
| | L4 | Standing with both knees bent or in semi-crouching position |
| | L5 | Standing with one leg with center of gravity bent or in semi-crouching position |
| | L6 | One or both knees are on floor |
| | L7 | Walking or moving |

FIG. 7

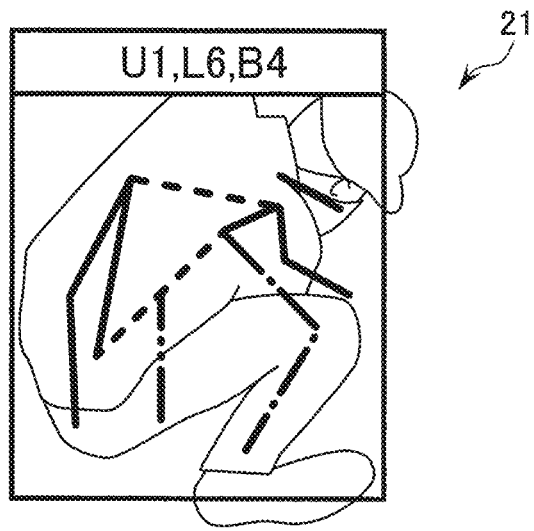
F I G. 8
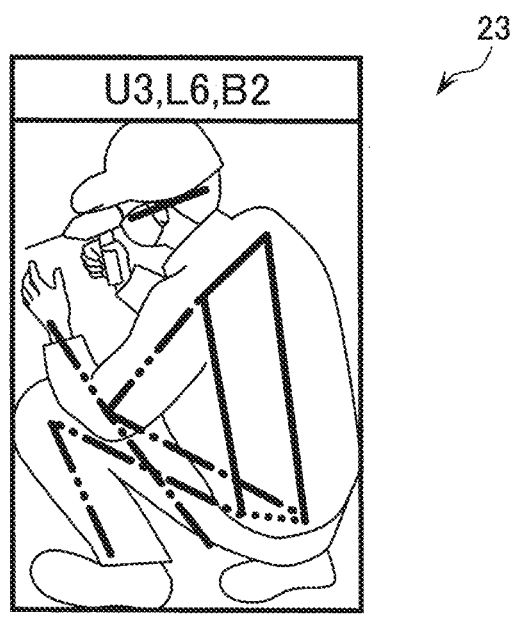
F I G. 9

| Back | Upper limbs | Lower limbs | | | | | | |
|---|---|---|---|---|---|---|---|---|
| | | L1 | L2 | L3 | L4 | L5 | L6 | L7 |
| B1 | U1 | 1 | 1 | 1 | 2 | 2 | 1 | 1 |
| | U2 | 1 | 1 | 1 | 2 | 2 | 1 | 1 |
| | U3 | 1 | 1 | 1 | 2 | 2 | 1 | 1 |
| B2 | U1 | 2 | 2 | 2 | 3 | 3 | 2 | 2 |
| | U2 | 2 | 2 | 2 | 3 | 3 | 3 | 2 |
| | U3 | 3 | 2 | 3 | 3 | 4 | 4 | 2 |
| B3 | U1 | 1 | 1 | 1 | 3 | 4 | 1 | 1 |
| | U2 | 2 | 1 | 1 | 4 | 4 | 3 | 1 |
| | U3 | 2 | 1 | 2 | 4 | 4 | 4 | 1 |
| B4 | U1 | 2 | 2 | 2 | 4 | 4 | 4 | 2 |
| | U2 | 3 | 2 | 3 | 4 | 4 | 4 | 2 |
| | U3 | 4 | 2 | 3 | 4 | 4 | 4 | 2 |

| |
|---|
| AC1: The load which this posture imposes on the musculoskeletal system is not a problem. No improvement is required. |
| AC2: This posture is harmful to the musculoskeletal system. Improvement is required early. |
| AC3: This posture is harmful to the musculoskeletal system. Improvement is required as soon as possible. |
| AC4: This posture is very harmful to the musculoskeletal system. Improvement is required immediately. |

FIG. 13

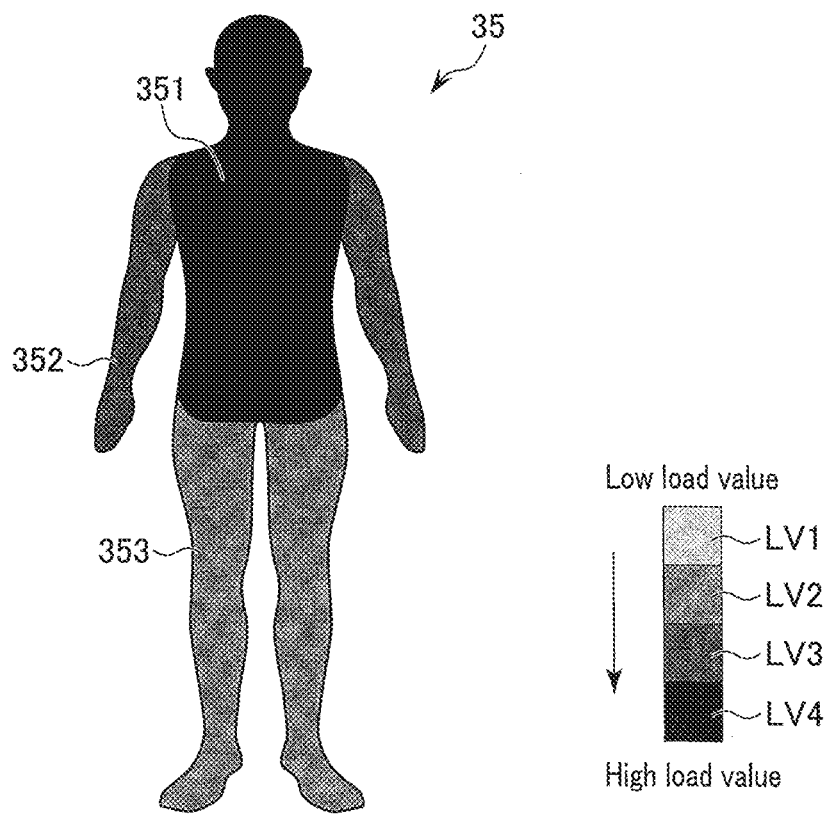

FIG. 14

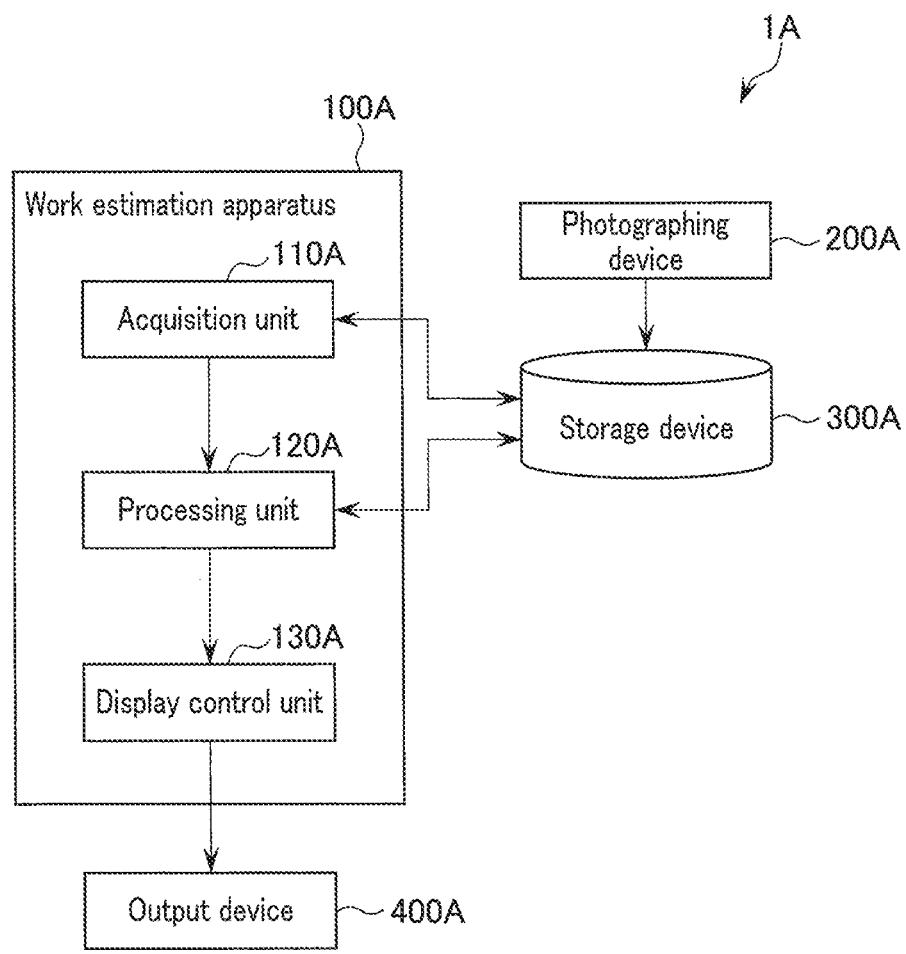
F I G. 16

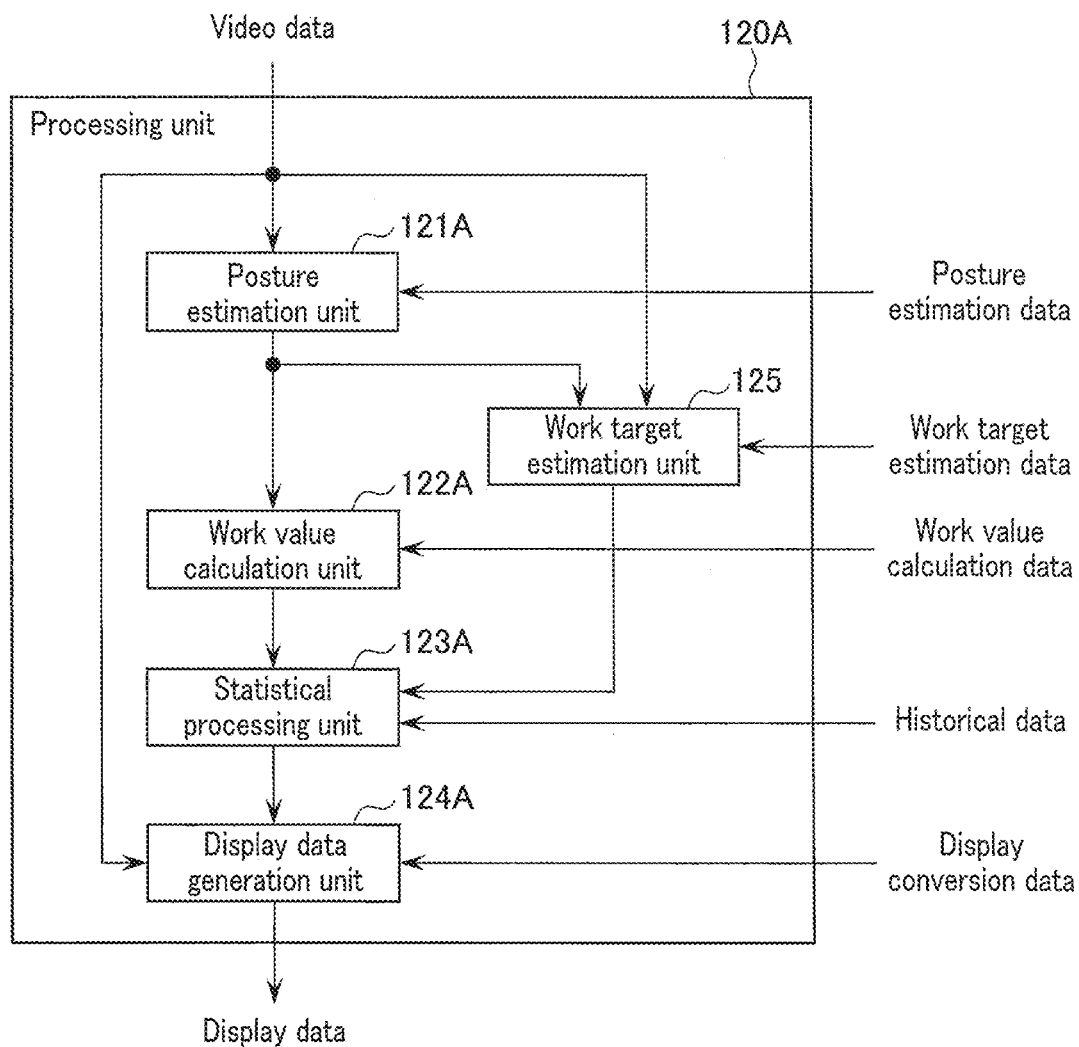
F I G. 17

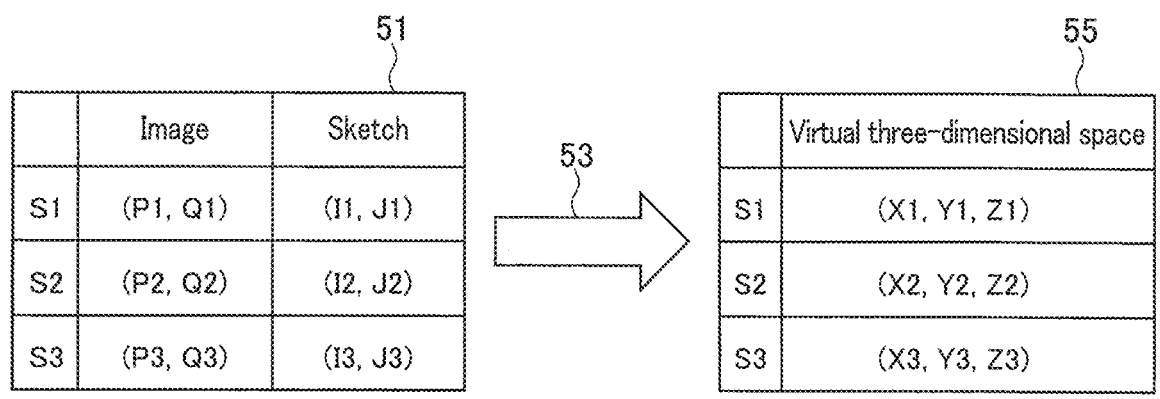
F I G. 25

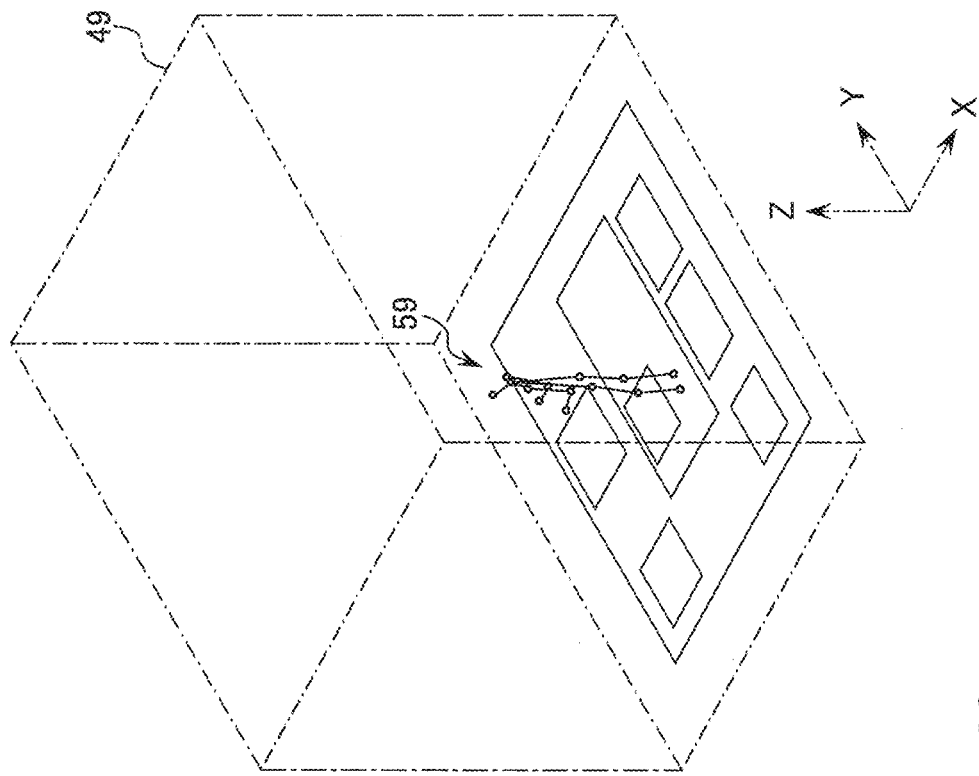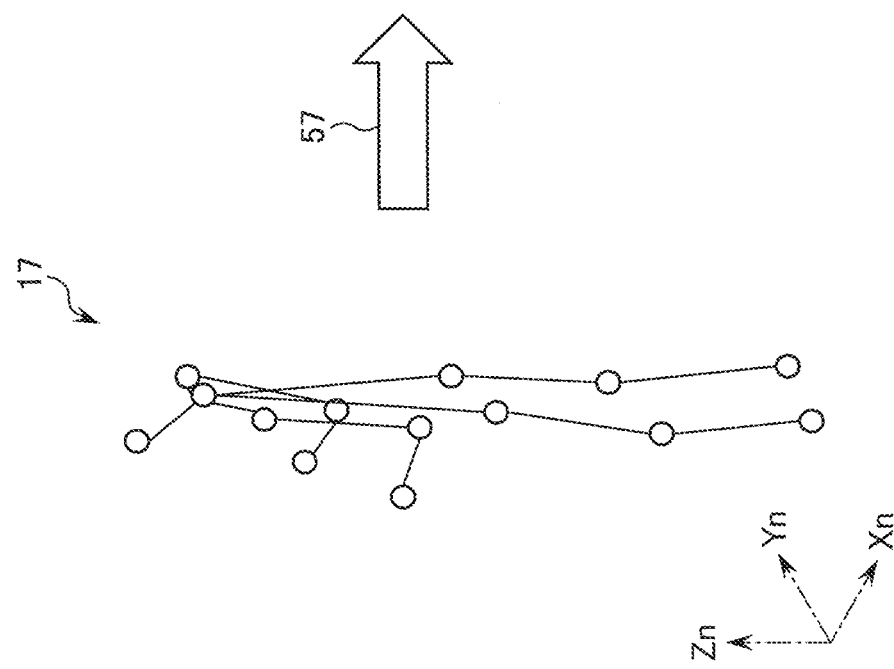
FIG. 26

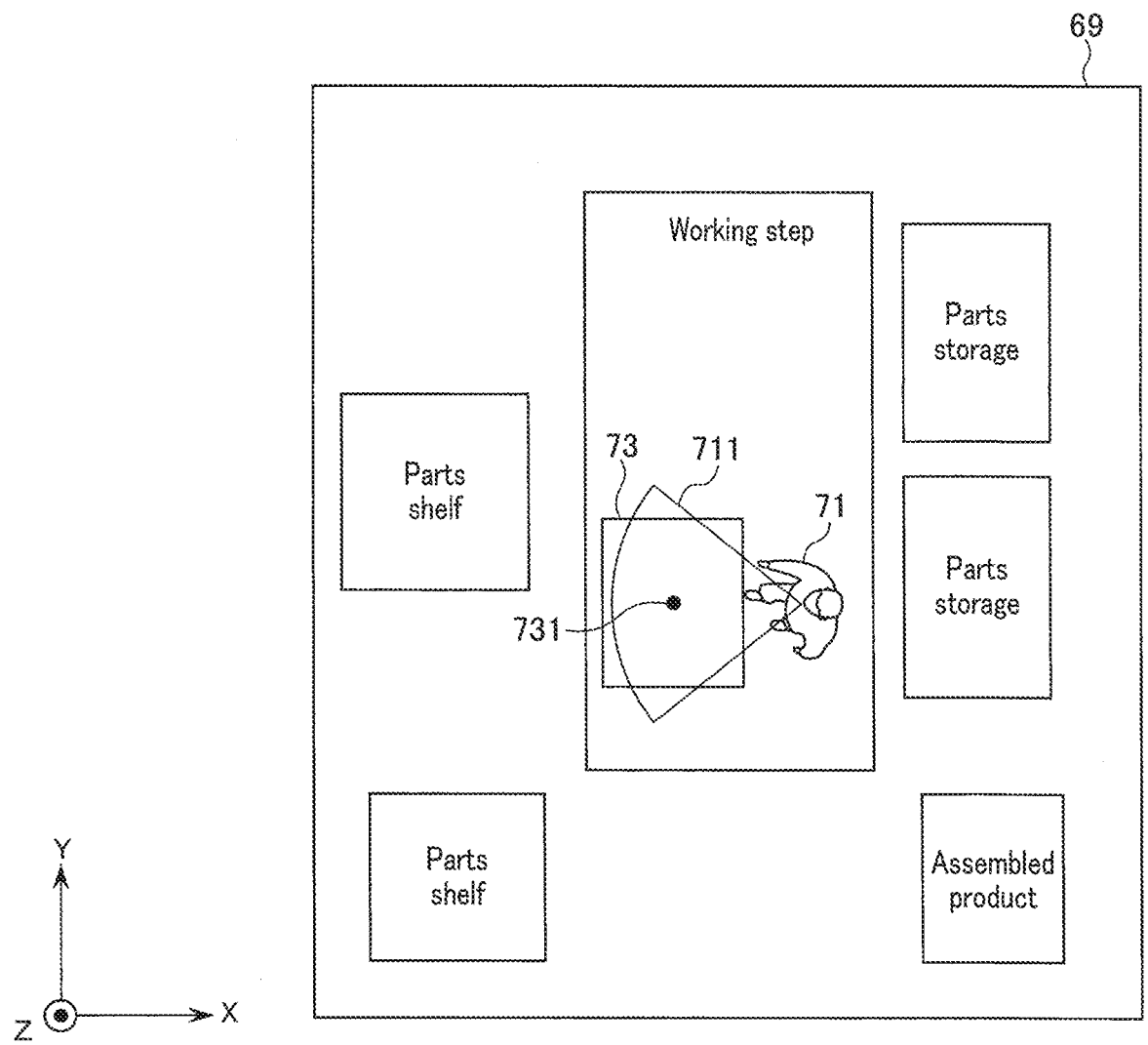
F I G. 29

WORK ESTIMATION APPARATUS, METHOD AND NON-TRANSITORY COMPUTER-READABLE STORAGE MEDIUM

CROSS-REFERENCE TO RELATED APPLICATIONS

This application is based upon and claims the benefit of priority from Japanese Patent Application No. 2020-154120, filed Sep. 14, 2020, the entire contents of which are incorporated herein by reference.

FIELD

Embodiments described herein relate generally to a work estimation apparatus, a method and a non-transitory computer-readable storage medium.

BACKGROUND

Conventionally, there is known a technique for acquiring the physical activity state of a worker by use of a wearable device, such as a wearable sensor and a wearable camera.

The wearable device, however, needs to be attached to the worker, so that it may be a hindrance to the work performed by the worker. Therefore, acquiring a work load of the worker by the wearable device may be a burden on the part of the worker who performs the work. In addition, there are concerns about the problem of the cost required for introducing the same number of wearable devices as the number of workers, and the problem of the maintenance and charging of the wearable devices.

There is also known a technique of associating the position of a worker in a work place with a work load of the worker acquired by a wearable device and visualizing them as a heat map on a sketch.

However, the heat map associates the position of the worker with the activity state of the worker, so that the work load on the equipment placed in the work place cannot be visualized.

BRIEF DESCRIPTION OF THE DRAWINGS

FIG. 1 is a block diagram showing a configuration example of a work estimation system including a work estimation apparatus according to a first embodiment.

FIG. 2 is a block diagram showing a configuration example of a processing unit of the work estimation apparatus according to the first embodiment.

FIG. 3 is a flowchart illustrating an operation example of the work estimation apparatus according to the first embodiment.

FIG. 5 is a diagram illustrating a two-dimensional human skeleton model according to the first embodiment.

FIG. 7 is a table illustrating how states of a plurality of body parts are classified according to the first embodiment.

FIG. 8 is a first example of how the posture of a worker is estimated from an image according to the first embodiment.

FIG. 9 is a second example of how the posture of a worker is estimated from an image according to the first embodiment.

FIG. 13 is a diagram illustrating how types of load values are in the first embodiment.

FIG. 14 is a human body diagram illustrating how accumulated load values are displayed in correspondence to a plurality of body parts according to the first embodiment.

FIG. 16 is a block diagram showing a configuration example of a work estimation system including a work estimation apparatus according to a second embodiment.

FIG. 17 is a block diagram showing a configuration of a processing unit of the work estimation apparatus according to the second embodiment.

FIG. 25 is a diagram illustrating how the coordinates of reference points in the image and the coordinates of reference points in the sketch are converted to coordinates of reference points of the virtual three-dimensional space according to the second embodiment.

FIG. 26 is a diagram for illustrating how a three-dimensional human skeleton model represented by normalized three-dimensional coordinates is arranged in the virtual three-dimensional space according to the second embodiment.

FIG. 29 is a diagram for illustrating how the direction of the worker is associated with work targets in the sketch according to the second embodiment.

DETAILED DESCRIPTION

Figure 4:
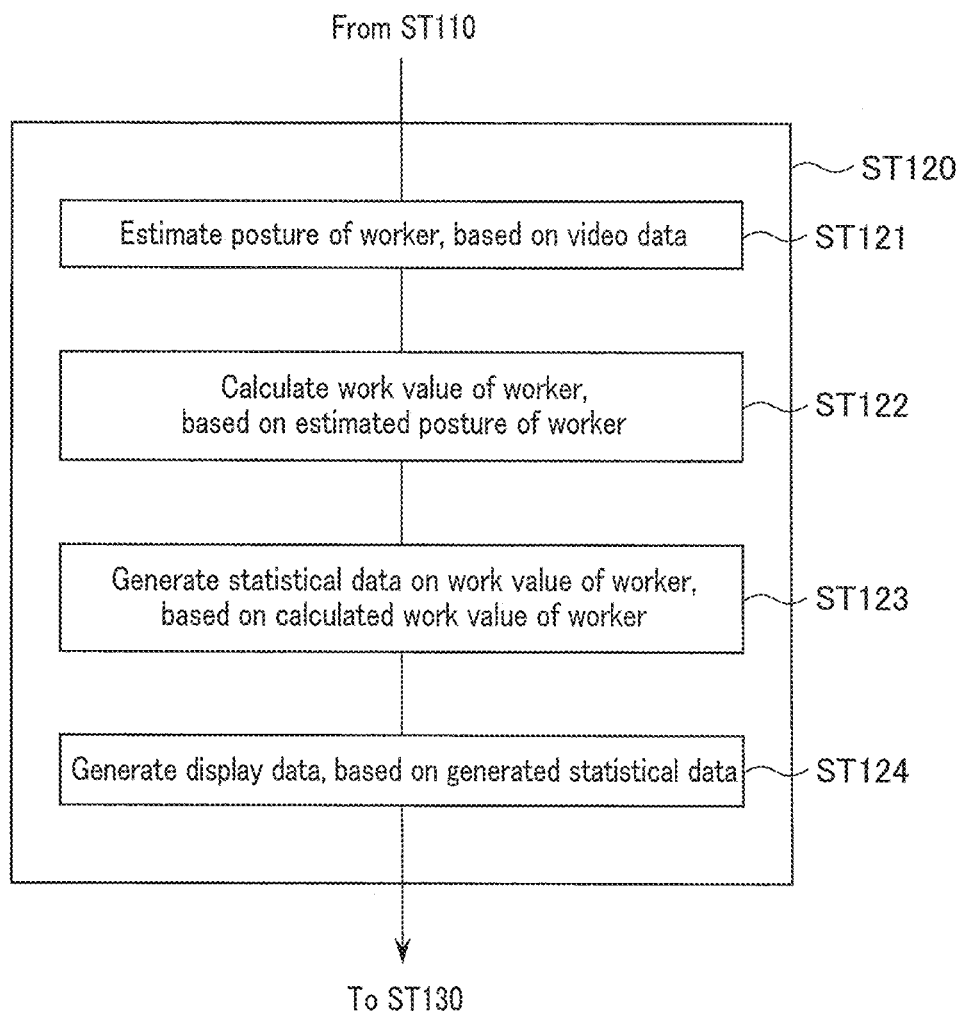
FIG. 4 is a flowchart illustrating a specific example of how the work value calculation processing is performed according to the first embodiment.

In general, according to one embodiment, a work estimation apparatus includes processing circuitry. The processing circuitry acquires video data on a predetermined area, calculates a work value related to work performed by a worker included in the video data, based on the video data, and displays the work value.

Embodiments of the work estimation apparatus will now be described in detail with reference to the accompanying drawings.

First Embodiment

FIG. 1 is a block diagram showing a configuration example of a work estimation system 1 including a work estimation apparatus 100 according to the first embodiment. The work estimation system 1 includes a work estimation apparatus 100, a photographing device 200, a storage device 300 and an output device 400. The work estimation system 1 is used to present (visualize) a state related to the work of a worker in a target area in association with a place and an object in the target area, in an expression format that is easy for the user to recognize.

The photographing device 200 is, for example, a video camera. The photographing device 200 photographs a work area (e.g. an assembly work place of a factory) where work is being performed by a worker, and acquires a still image or a moving image. In the present embodiment, the still image or moving image acquired by the photographing device 200 is referred to as video data. The photographing device 200 outputs the acquired video data to the storage device 300. The photographing device 200 may output the acquired video data directly to the work estimation apparatus 100. The video data may include a photographing time.

The storage device 300 is a computer-readable storage medium that stores data in a nonvolatile manner. This storage medium is, for example, a flash memory, an HDD (Hard Disk Drive) or an SSD (Solid State Drive). The storage device 300 stores video data output from the photographing device 200. Further, the storage device 300 stores, for example, a plurality of data used in the work estimation apparatus 100. The plurality of data include, for example, posture estimation data, work value calculation data, history data, display conversion data, etc. Details of each of the plurality of data will be described later. The storage device 300 outputs video data and a plurality of data to the work estimation apparatus 100 in response to access from the work estimation apparatus 100.

The video data stored in the storage device 300 may be associated, for example, with calendar information or Gantt chart information. The storage device 300 may be provided in an external server. The storage device 300 may include a plurality of storage media. Each of the plurality of storage media may be used properly according to the type of data which is to be stored. Specifically, the HDD or SSD used as a storage medium may store video data that is large in data amount, and the flash memory used as a storage medium may store the above-mentioned plurality of data that are small in data amount.

The work estimation apparatus 100 is, for example, a computer used by a system administrator (hereinafter, referred to as a user) who manages the work estimation system 1. The work estimation apparatus 100 includes an acquisition unit 110, a processing unit 120 and a display control unit 130. The work estimation apparatus 100 may include at least one of the photographing device 200, the storage device 300 and the output device 400.

The acquisition unit 110 acquires video data from the storage device 300. The acquired video data may be video data that are photographed in real time by the photographing device 200 and sequentially stored in the storage device 300, or may be video data that are stored in advance in the storage device 300. The acquisition unit 110 outputs the acquired video data to the processing unit 120. The acquisition unit 110 may acquire video data directly from the photographing device 200. For example, the acquisition unit 110 may collectively acquire moving images as one data, or may sequentially acquire moving images in a streaming format.

The processing unit 120 receives video data from the acquisition unit 110. The processing unit 120 calculates a work value related to the posture of a worker (working posture), based on the video data. The work value may be paraphrased as a value related to the work performed by the worker. By accessing the storage device 300, the processing unit 120 may receive a plurality of data necessary for processing the video data. The processing unit 120 may cause the storage device 300 to store the calculated work value as it is, or may cause the storage device 300 to store the calculated work value in association with the video data or information related to the video data (video data information). The video data information includes, for example, a file name of the video data and frame information related to frames constituting the video data. By causing the storage device 300 to store the work value in association with the video data or the video data information, the work estimation apparatus 100 can perform useful visualization and calculation of useful statistical values.

The work value includes, for example, at least a value (load value) representing the physical load of the worker. When the processing unit 120 calculates the load value, the processing unit 120 calculates, for example, a posture feature amount of the worker, based on the video data, estimates a working posture of the worker, based on the calculated posture feature amount, and calculates a load value, based on the working posture. The work value may include a value indicative of the type of work and a value indicative of the attendance state of the worker. The work estimation apparatus 100 may present these values to the user in association with the load values. This can be useful for business improvement.

The processing unit 120 generates display data in an expression format that is easy for the user to recognize, based on the calculated work value. The display data according to the first embodiment is, for example, statistical data (described later) of work values calculated for a plurality of body parts (e.g., the back, the upper limbs, the lower limbs, etc.) of a human body diagram that is regarded as a worker. Specifically, the display data according to the first embodiment is obtained by superimposing a map corresponding to the statistical data described later on the plurality of body parts of the human body diagram. The processing unit 120 outputs the generated display data to the display control unit 130. The processing unit 120 may cause the storage device 300 to store the generated display data as it is, or may cause the storage device 300 to store the generated display data in association with the video data or the video data information. The display data may include numerical values included in the statistical data, figures corresponding to the numerical values and a table or a graph that is based on the statistical data, such that they are shown on the human body diagram or in the neighborhood thereof.

The display control unit 130 receives display data from the processing unit 120. The display control unit 130 causes the output device 400 to display the display data.

FIG. 2 is a block diagram showing a configuration example of the processing unit 120 of the work estimation apparatus 100 according to the first embodiment. The processing unit 120 includes a posture estimation unit 121, a work value calculation unit 122, a statistical processing unit 123 and a display data generation unit 124.

The posture estimation unit 121 estimates a posture of the worker, based on the video data. Specifically, the posture estimation unit 121 detects a worker from the video data, using posture estimation data, and estimates a posture of the detected worker. The posture estimation unit 121 outputs information on the estimated posture of the worker to the work value calculation unit 122.

The posture estimation data include, for example, a learned machine learning model (hereinafter, referred to simply as a "learned model") trained to detect a person from video data, a learned model trained to estimate a posture of a person, and a learned model trained to perform both. As these learned models, a Neural Network (NN) is used, and preferably a Convolutional Neural Network (CNN) is used. By using the CNN, a target (a person in the present embodiment) can be accurately detected from an image. The learned model is not limited to the CNN, and various other NNs suitable for intended use (e.g., Graph Neural Network (GNN) 3D-CNN, etc.) may be used. This holds true of the processing described below.

The learned models used to estimate the posture of a person include, for example, a two-dimensional skeleton estimation model that estimates a skeleton of a person of video data on a two-dimensional image, a three-dimensional skeleton estimation model that estimates a three-dimensional skeleton by applying a two-dimensional skeleton estimation result (corresponding to a "two-dimensional human skeleton model" described later) to normalized three-dimensional coordinates, and a behavior estimation model that estimates a behavior of a person from time-series data on a three-dimensional skeleton estimation result ("three-dimensional human skeleton model" described later). The two-dimensional skeleton estimation model and the three-dimensional skeleton estimation model may be collectively referred to as a skeleton estimation model. Both the skeleton estimation result and the human skeleton model may be paraphrased as posture features.

The two-dimensional skeleton estimation model is trained in advance such that a person can be detected from video data and a skeleton can be detected from the detected person. The three-dimensional skeleton estimation model is trained in advance such that a three-dimensional skeleton can be estimated from the skeleton of a person on a two-dimensional image. The behavior estimation model is trained in advance such that a behavior and a posture of a person can be estimated from the time series data on the three-dimensional skeleton. The behavior estimation model is not limited to this. For example, a model that determines whether or not a person in a still image is walking with a reliability from zero to 1 may be used. Further, a three-dimensional skeleton estimation model that estimates a three-dimensional human skeleton model of a person directly from video data may be used without using a two-dimensional skeleton estimation model. In this case, a two-dimensional human skeleton model may be estimated from the three-dimensional human skeleton model.

The posture estimation unit 121 may specify a worker, based on the video data. Specifically, the posture estimation unit 121 identifies a detected worker by using worker identification data. The worker identification data includes for example, a learned model (worker identification model) trained to identify a worker from video data. The worker identification model is trained in advance such that the worker can be identified from a face photograph of a worker and a photograph of the clothes of the worker.

The work value calculation unit 122 receives information on the posture of a worker from the posture estimation unit 121. The work value calculation unit 122 calculates a work value of the worker, based on the posture of the worker. Specifically, the work value calculation unit 122 calculates the work value of the worker corresponding to the posture of the worker, by using work value calculation data. The work value calculation unit 122 outputs the calculated work value of the worker to the statistical processing unit 123.

The work value calculation data includes, for example, a learned model trained to calculate a work value from the posture of a person, a table in which the posture of the person and the work value are associated with each other, etc. The work value calculation data may include a face photograph of each of a plurality of workers, a work process chart of each of the plurality of workers, a table in which a work and a work place are associated with each other, a photograph of the clothes of each of the workers, etc. Thus, the work value calculation unit 122 may perform processing for identifying a plurality of workers, processing for specifying the work of each worker and specifying a work place. It should be noted that these processes may be performed by a unit other than the work value calculation unit 122.

The statistical processing unit 123 receives a work value of a worker from the work value calculation unit 122. The statistical processing unit 123 generates statistical data regarding the work value of the worker, based on the work value. Specifically, the statistical processing unit 123 generates, as statistical data, work values accumulated from the start of work to each arbitrary point of time, based on the work period of the worker and the work value corresponding to each point of time of the work period. Where the work value is a load value, the work value (load value) may be generated for each of a plurality of body parts. The statistical processing unit 123 outputs the generated statistical data to the display data generation unit 124.

When an accumulated work value is calculated, the statistical processing unit 123 may give a weight thereto in consideration of the forgetting rate. Specifically, the statistical processing unit 123 adds work values calculated in the past after they are multiplied by a weighting coefficient of 1 or less so that the influence of the work values calculated in the past may be small. In this manner, an accumulated work value is calculated. As the weighting coefficient, for example, a numerical value corresponding to a Gaussian distribution centered on the latest point of time is used.

The statistical processing unit 123 may generate statistical data as a time-averaged value of the accumulated work value (hereinafter, referred to as an average work value) by dividing the accumulated work value by the work period. Where weighting is performed in consideration of the forgetting rate, the statistical processing unit 123 generates statistical data by dividing the accumulated work value by an integral value of the weighting coefficient in the work period. The statistical processing unit 123 may generate statistical data by setting arbitrary conditions, such as a specific worker, a specific date and time, a specific season, a specific point of time, a specific area in the work area or specific work content.

The statistical processing unit 123 may generate statistical data, based on historical data. The historical data includes, for example, information on the postures of the worker calculated in the past, work values of the worker calculated in the past, statistical data generated in the past, etc. Specifically, for example, data for the past week is accumulated in the historical data. Thus, based on the data for the past week, the statistical processing unit 123 can generate statistical data, such as a cumulative value and an average work value of the work values of the past week, or a cumulative value and an average work value of the work values for each day of the week.

The display data generation unit 124 receives statistical data from the statistical processing unit 123. The display data generation unit 124 generates display data, based on the statistical data. Specifically, the display data generation unit 124 uses display conversion data and converts the statistical data into display data to be displayed in an expression format that is easy for the user to recognize. More specifically, the display data generation unit 124 generates display data in which the accumulated work values included in the statistical data are displayed in correspondence to a plurality of body parts of a human body diagram regarded as a worker.

The display conversion data includes, for example, a human body diagram regarded as a worker, a GUI (Graphical User Interface) for displaying a plurality of human body diagrams in time series, etc.

The output device 400 is, for example, a monitor. The output device 400 receives display data from the processing unit 120. The output device 400 displays the display data. The output device 400 is not limited to the monitor as long as the display data can be displayed. For example, the output device 400 may be a projector or a printer. The output device 400 may include a speaker.

The work estimation apparatus 100 may include a memory and a processor (neither is shown). The memory stores, for example, various programs related to the operation of the work estimation apparatus 100 (e.g., a work estimation program that estimates a work of a worker). The processor realizes each function of the acquisition unit 110, the processing unit 120 and the display control unit 130 by executing various programs stored in the memory.

The configuration of the work estimation system 1 and the work estimation apparatus 100 according to the first embodiment has been described above. Next, the operation of the work estimation apparatus 100 will be described with reference to the flowchart of FIG. 3.

FIG. 3 is a flowchart showing an operation example of the work estimation apparatus 100 according to the first embodiment. The process of the flowchart of FIG. 3 starts when the work estimation program is executed by the user.

(Step ST110)

When the work estimation program is executed, the acquisition unit 110 acquires video data from the storage device 300. The acquisition unit 110 outputs the acquired video data to the processing unit 120.

(Step ST120)

After the video data is acquired, the processing unit 120 calculates a work value related to the posture of the worker, based on the video data. In addition, the processing unit 120 generates display data that is based on the work value. In the description below, the processing of step ST120 is referred to as "work value calculation processing." A specific example of the work value calculation processing will be described with reference to the flowchart of FIG. 4.

FIG. 4 is a flowchart showing a specific example of the work value calculation processing according to the first embodiment. The flowchart of FIG. 4 illustrates details of the processing of step ST120 shown in FIG. 3.

(Step ST121)

After the video data is acquired, the posture estimation unit 121 estimates a posture of the worker, based on the video data. Specifically, the posture estimation unit 121 detects a skeleton of a person from video data, using a two-dimensional skeleton estimation model. The skeleton of the person can be represented, for example, by data in which a plurality of key points in the person detected from the video data are associated with pixel coordinates (two-dimensional coordinates) of the video data. In the description below, the data in which a plurality of key points are associated with the two-dimensional coordinates will be referred to as a two-dimensional human skeleton model.

FIG. 5 is a diagram illustrating a two-dimensional human skeleton model 11 according to the first embodiment. The two-dimensional human skeleton model 11 shown in FIG. 5 is represented, for example, by 18 key points KP1 to KP18 of the human body on the two-dimensional coordinates (P, Q). Key points KP1 to KP18 respectively correspond to "right eye", "left eye", "right ear", "left ear", "nose", "neck", "right hand", "left hand", "right elbow", "left elbow", "right shoulder", "left shoulder", "right hip", "left hip", "right knee", "left knee", "right foot" and "left foot."

After the two-dimensional human skeleton model is generated, the posture estimation unit 121 generates a human skeleton model in three dimensions (three-dimensional human body skeleton model) by applying the two-dimensional human skeleton model to normalized three-dimensional coordinates, using a three-dimensional skeleton estimation model. When the three-dimensional human skeleton model is generated from the two-dimensional human skeleton model, the posture estimation unit 121 converts, for example, 18 key points of the two-dimensional human skeleton model into 14 key points represented by three-dimensional coordinates. The 14 key points are respectively "head", "neck", "right hand", "left hand", "right elbow", "left elbow", "right shoulder", "left shoulder", "right hip", "left hip", "right knee", "left knee", "right foot" and "left foot." The key point "head" of the three-dimensional human skeleton model may be estimated, for example, from five key points KP1 to KP5 of the two-dimensional human skeleton model, namely, "right eye", "left eye", "right ear", and "left ear" and "nose", or may be obtained by assuming the "nose" at key point KP5 as the "head." In the description below, the key point "head" of the three-dimensional human skeleton model will be represented as the key point KPH.

Figure 6:
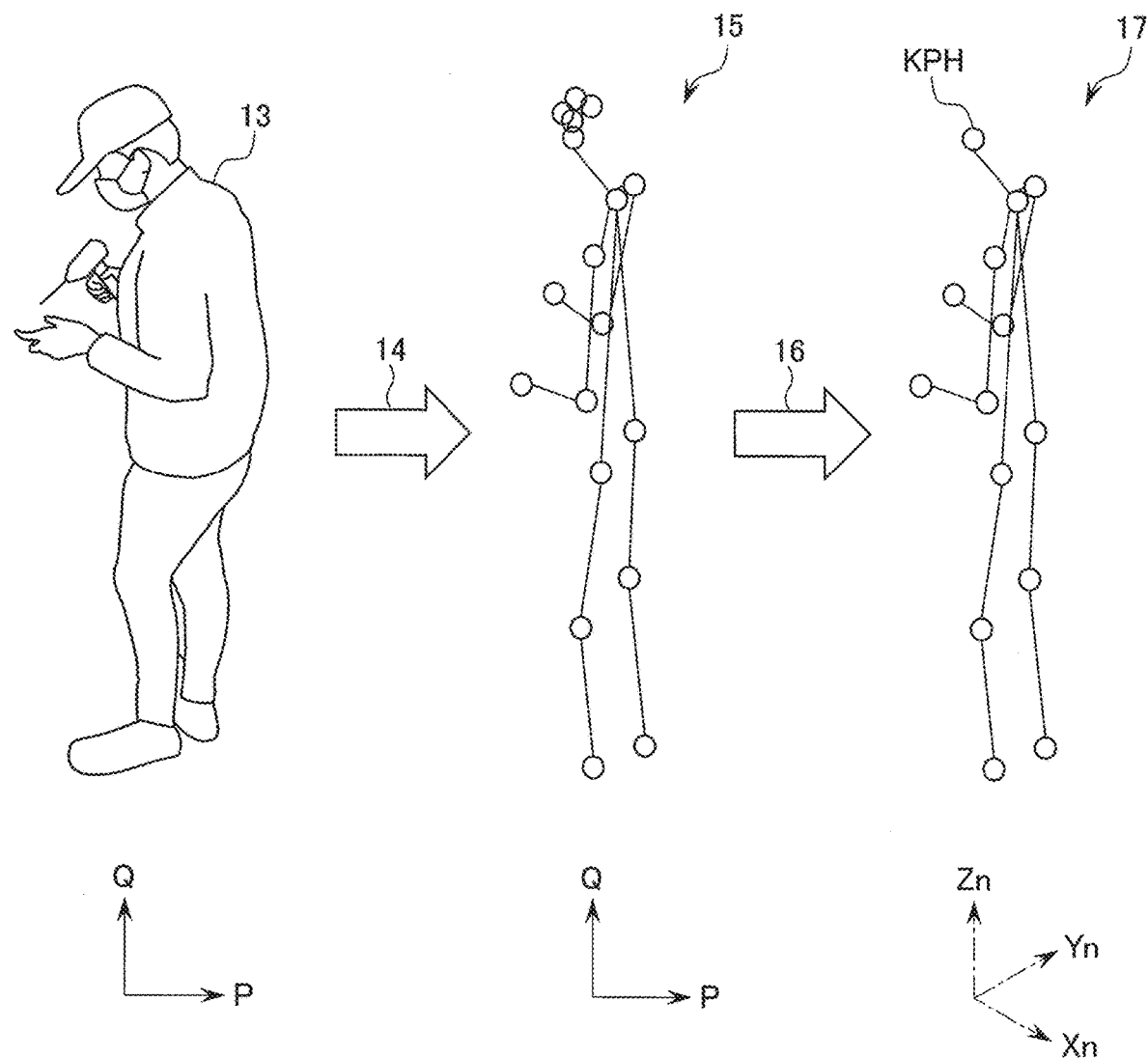
FIG. 6 is a diagram illustrating how a two-dimensional human skeleton model and a three-dimensional human skeleton model are estimated from an image according to the first embodiment.

FIG. 6 is a diagram illustrating how a two-dimensional human skeleton model and a three-dimensional human skeleton model are generated from an image according to the first embodiment. The worker 13 shown in FIG. 6 corresponds, for example, to a person detected from video data. After the worker 13 is detected, the posture estimation unit 121 generates a two-dimensional human skeleton model 15 corresponding to the worker 13 by applying the two-dimensional skeleton estimation model 14 to the video data including the worker 13. At this time, the two-dimensional human skeleton model 15 represented, for example, on the same two-dimensional coordinates (P, Q) as the video data.

Thereafter, the posture estimation unit 121 generates a three-dimensional human skeleton model 17 corresponding to the worker 13 by applying the three-dimensional skeleton estimation model 16 to the two-dimensional human skeleton model 15. At this time, the three-dimensional human skeleton model 17 is represented on the normalized three-dimensional coordinates (Xn, Yn, Zn).

After the three-dimensional human skeleton model is generated, the posture estimation unit 121 estimates a behavior and a posture of the person from the time series data on the three-dimensional human skeleton model, using a behavior estimation model. The estimation of the behavior of the person is based on whether or not the person is moving (e.g., "walking or moving"), and the estimation of the posture of the person is performed irrespectively of whether or not the person is moving. For example, the posture is determined, based on how the states of a plurality of body parts are combined. Therefore, the states of the plurality of body parts have to be classified first. The states of the body parts may be paraphrased as the postures of the body parts. In the description below, it is assumed that "estimation of posture" includes "estimation of human behavior."

FIG. 7 is a table illustrating how states of a plurality of body parts are classified according to the first embodiment. In the table 19 shown in FIG. 7, body parts, state classification symbols and states are shown in association with each other. Specifically, the body parts are "back", "upper limbs", and "lower limbs." The state classification symbols define states of the body parts. The table 19 shown in FIG. 7 is based on, but is not limited to, the OWAS (Ovako Working Posture Analyzing System) method, which is one of the methods for evaluating the work load of the worker. Although the influence of the weight or the force applied to the worker can be taken into consideration in the OWAS method, the influence of the weight or the force applied to the worker will not be taken into consideration in the first and subsequent embodiments.

With respect to the "back", four state classification symbols B1 to B4 are listed. The four state classification symbols B1 to B4 respectively corresponds to "straight" (B1), "bent forward or backward" (B2), "twisted or bent sideways" (B3), and "twisted and bent sideways, or bent diagonally forward" (B4).

With respect to the "upper limbs", three state classification symbols U1 to U3 are listed. The three state classification symbols U1 to U3 respectively correspond to the state "both arms are below shoulder" (U1), the state "one arm is at shoulder height or above" (U2), and the state "both arms are at shoulder height or above" (U3).

As for the "lower limbs", seven state classification symbols L1 to L7 are listed. The seven state classification symbols L1 to L7 respectively correspond to the state "sitting" (L1), the state "standing with both legs straight" (L2), the state "standing with one leg with center of gravity straight" (L3), the state "standing with both knees bent or in semi-crouching position" (L4), the state "standing with one leg with center of gravity bent or in semi-crouching position" (L5), the state "one or both knees are on floor" (L6), and the state "walking or moving" (L7).

Next, a detailed description will be given of a method in which the states of a plurality of body parts are classified from a three-dimensional human skeleton model.

The states of the "back" of the three-dimensional human skeleton model can be classified, for example, by an angle by which the waist is bent and an angle by which the waist twisted. Specifically, the states of the "back" can be distinguished by detecting whether or not the waist is bent by 20 degrees or more and whether or not the waist is twisted by 20 degrees or more.

The posture estimation unit 121 calculates an angle by which the waist is bent, based on angle θ1 formed by vector v1 and vector v2, the vector v1 representing the direction from the midpoint of the hips (key point KP13 of the "right hip" and key point KP14 of the "left hip") of the three-dimensional human skeleton model to the midpoint between the feet (key point KP17 of the "right foot" and key point KP18 of the "left foot"), and the vector v2 representing the direction from, the midpoint of the hips to the neck (key point KP6 of the "neck"). The posture estimation unit 121 further calculates an angle by which the waist is twisted, based on angle θ2 formed by vector v3 and vector v4, the vector v3 representing the direction from the right hip to the left hip of the three-dimensional human skeleton model, and the vector v4 representing the direction from the right shoulder (key point KP11 of the "right shoulder") to the left shoulder (key point KP12 of the "left shoulder"). The posture estimation unit 121 classifies (estimates) the states of the "back", based on whether or not each of the angles θ1 and θ2 exceeds 20 degrees.

The states of the "upper limbs" of the three-dimensional human skeleton model can be classified, for example, by the height of the right arm and the height of the left arm. Specifically, the states of the "upper limbs" can be distinguished by checking whether the right arm is above the shoulder height and whether the left arm is above the shoulder height.

The posture estimation unit 121 detects whether the height-direction coordinate of the right hand (key point KP7 of the "right hand") or right elbow (key point KP9 of the "right elbow") of the three-dimensional human skeleton model is above the height-direction coordinate of the right shoulder. The posture estimation unit 121 further detects whether the height-direction coordinate of the left hand (key point KP8 of the "left hand") or left elbow (key point KP10 of the "left elbow") of the three-dimensional human skeleton model is above the height-direction coordinate of the left shoulder. From these detections, the posture estimation unit 121 estimates the state of the "upper limbs."

The states of the "lower limbs" of the three-dimensional human skeleton model can be classified by detecting the position of the buttocks with respect to the horizontal plane, the angle of the right leg and the angle of the left leg, the positions of the right foot and left foot with respect to the horizontal plane, the positions of the right knee and left knee with respect to the horizontal plane and whether or not walking is being performed. Specifically, the states of the "lower limbs" can be distinguished by detecting whether or not the buttocks are on the floor (or chair), whether or not the right leg is bent by 150 degrees or less, whether or not the left leg is bent by 150 degrees or less, whether or not the right foot is in contact with the floor, whether or not the left foot is in contact with the floor, whether or not the right knee is in contact with the floor, whether or not the left knee is in contact with the floor, and whether or not the walking movement is being performed.

The posture estimation unit 121 calculates angle θ3 formed by vector v5 and vector 6, the vector v5 representing the direction from the right hip to the right knee (key point KP15 of the "right knee") of the three-dimensional human skeleton model, and the vector v6 representing the direction from the right knee to the right foot. Then, the posture estimation unit 121 determines whether or not the angle θ3 is 150 degrees or less. The posture estimation unit 121 determines whether or not the right foot is in contact with the floor by checking whether or not the coordinates of the right foot of the three-dimensional human skeleton model are above the floor (the height-direction coordinate value of which is, for example, zero). Similarly, the posture estimation unit 121 determines whether or not the right knee is in contact with the floor by checking whether or not the coordinates of the right knee of the three-dimensional human skeleton model are above the floor. The posture estimation unit 121 makes these determinations on the left side of the body as well. Further, the posture estimation unit 121 determines whether or not the worker is walking, based on the estimation of the behavior of the worker. From these detections, the posture estimation unit 121 estimates the state of the "lower limbs." In the present embodiment, the state of sitting down is not assumed, so that the buttocks are not in contact with the floor at all times.

As described above, posture estimation results using the behavior estimation model are expressed as combinations of the states of a plurality of body parts. Specifically, a posture estimation result corresponds to a combination of state classification symbols of a plurality of body parts shown in the Table 19 of FIG. 7. In the description below, postures of workers estimated from images will be described with reference to FIGS. 8 to 11. The workers in the images shown in FIGS. 8 to 11 are superimposed with a frame indicative of worker detection, a posture estimation result, and a line and a broken line indicative of a three-dimensional human skeleton model.

FIG. 8 is a first example of how a posture of a worker is estimated from an image according to the first embodiment. FIG. 8 shows a worker who bends down to perform work. The posture estimation result 21 shown in FIG. 8 is "U1, L6, B4." According to the posture estimation result 21, the posture of the worker shown in FIG. 8 is as follows: the back is in the state of being "twisted and bent sideways, or bent diagonally forward" (B4), the upper limbs are in the state where "both arms are below shoulder" (U1), and the lower limbs are in the state where "one or both knees are on floor" (L6).

FIG. 9 is a second example of how a posture of a worker is estimated from an image according to the first embodiment. FIG. 9 shows a worker who bends down to perform work. The posture estimation result 23 shown in FIG. 9 is "U3, L6, B2." According to the posture estimation result 23, the posture of the worker shown in FIG. 9 is as follows: the back is in the state of being "bent forward or backward" (B2), the upper limbs are in the state where "both arms are at shoulder height or above", and the lower limbs are in the state where "one or both knees are on floor" (L6).

Figure 10:
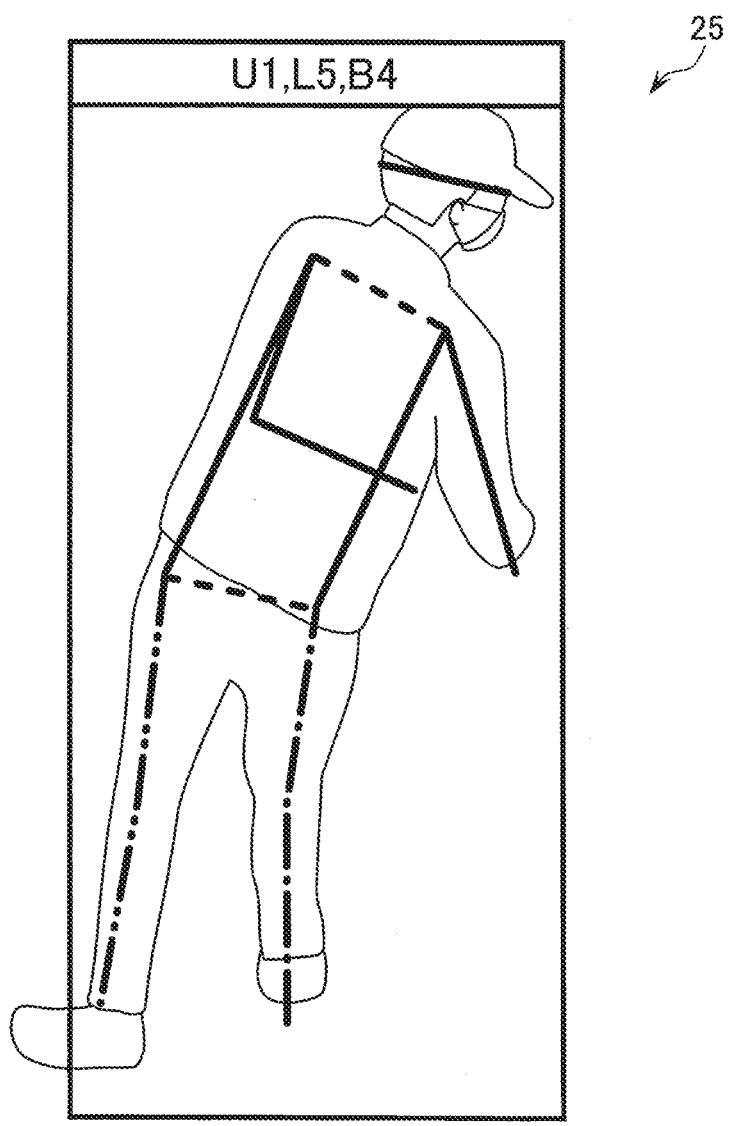
FIG. 10 is a third example of how the posture of a worker is estimated from an image according to the first embodiment.

FIG. 10 is a third example of how a posture of a worker is estimated from an image according to the first embodiment. FIG. 10 shows an operator who works, with the center of gravity being on one leg. The posture estimation result 25 shown in FIG. 10 is "U1, L5, B4." According to the posture estimation result 25, the posture of the worker shown in FIG. 10 is as follows: the back is in the state of being "twisted and bent sideways, or bent diagonally forward" (B4), the upper limbs are in the state where "both arms are below shoulder" (U1), and the lower limbs are in the state "standing with one leg with center of gravity bent or in semi-crouching position" (L5).

Figures 11, 12:
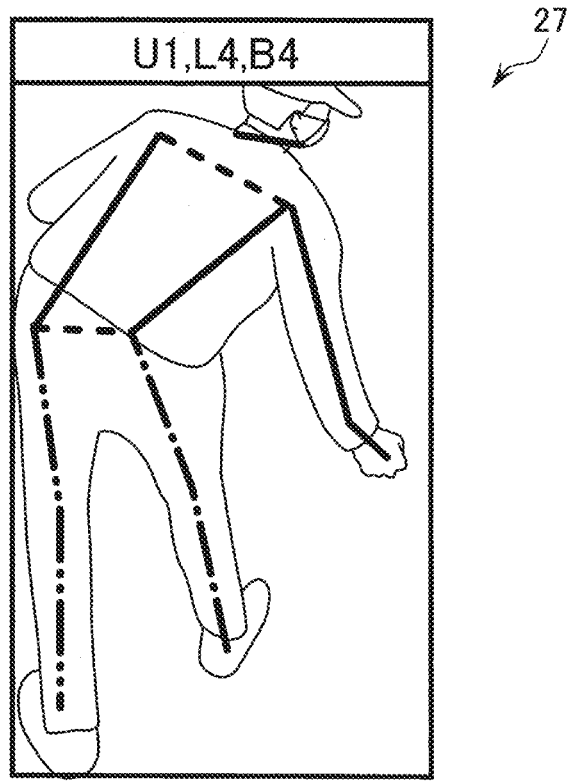
FIG. 11 is a fourth example of how the posture of a worker is estimated from an image according to the first embodiment.
FIG. 12 is a table in which a combination of states of a plurality of body parts and load values are associated with each other according to the first embodiment.

FIG. 11 is a fourth example of how a posture of a worker is estimated from an image according to the first embodiment. FIG. 11 shows a worker who works with his upper body bent. The posture estimation result 27 shown in FIG. 11 is "U1, L4, B4." According to the posture estimation result 27, the posture of the worker shown in FIG. 11 is as follows: the back is in the state of being "twisted and bent sideways, or bent diagonally forward" (B4), the upper limbs are in the state where "both arms are below shoulder" (U1), and the lower limbs are in the state "standing with both knees bent or in semi-crouching position" (L4).

(Step ST122)

After the posture of the worker is estimated, the work value calculation unit 122 calculates a work value of the worker, based on the estimated posture of the worker. Specifically, the work value calculation unit 122 calculates a load value as the work value from the posture of the worker, by using a table in which a combination of states of a plurality of body parts and load values are associated with each other. Alternatively, the work value calculation unit 122 may use a learned model trained to calculate a work value from an estimated posture of the worker. The learned model mentioned here should preferably use a GNN, for example.

FIG. 12 is a table in which a combination of states of a plurality of body carts and load values are associated with each other in the first embodiment. In Table 29, the column direction items show combinations of the state classification symbols of the "back" and state classification symbols of the "upper limbs", the row direction items show state classification symbols of the "lower limbs, and load values are shown in the load value group region 31 at the positions corresponding to the items of the matrix. In the load value group region 31, four numbers (load values) 1 to 4 are assigned in ascending order of load value. The table 29 in FIG. 12 is based on the OWAS method, but this is not restrictive.

Specifically, in the table 29, three state classification symbols U1 to U3 of the "upper limbs" are combined with four state classification symbols B1 to B4 of the "back." Further, seven state classification symbols L1 to L7 of the "lower limbs" are associated with each of these combinations. That is, the number of items in the row direction is 12, the number of items in the column direction is 7, and the load value group region 31 contains 84 load values.

For example, in the first example shown in FIG. 8, the posture estimation result 21 is "U1, L6, B4", so that the combination of the "back" and the "upper limbs" is defined by "B4" and "U1", and the "lower limbs" are in the state of "L6." Thus, the load, value is "4" in the load value group region 31. Similarly, in the second example shown in FIG. 9, the posture estimation result 23 is "U3, L6, B2", and the load value is "4" in the load value group region 31. In the third example shown in FIG. 10, the posture estimation result 25 is "U1, L5, B4", and the load value is "4" in the load value group region 31. In the fourth example shown in FIG. 11, the posture estimation result 27 is "U1, L4, B4", and the load value is "4" in the load value group region 31. Therefore, the work value calculation unit 122 calculates load value "4" for each of the postures of the workers shown in FIGS. 8 to 11 by using the table 29.

Where the load values of a plurality of body parts are specified, the ratio of load values relating to the plurality of body parts may be associated with the load values in the load value group region 31. As an alternative method, state classification symbols assigned to the states of body parts shown in FIG. 7 and load values may be associated with each other.

FIG. 13 is a diagram illustrating how types of load values are in the first embodiment. In the table 33 shown in FIG. 13, load states AC1 to AC4 are shown in correspondence to the load values 1 to 4 of the load value group region 31. For example, AC1 means "The load which this posture imposes on the musculoskeletal system is not a problem. No improvement is required." AC2 means "This posture is harmful to the musculoskeletal system. Improvement is required early." AC3 means "This posture is harmful to the musculoskeletal system. Improvement is required as soon as possible." AC4 means "This posture is very harmful to the musculoskeletal system. Improvement is required immediately." The table 33 in FIG. 13 is based on the OWAS method, but this is not restrictive.

(Step ST123)

After a work value of the worker is calculated, the statistical processing unit 123 generates statistical data regarding the work value of the worker, based on the work value. Specifically, the statistical processing unit 123 generates, as statistical data, work values accumulated from the start time of work to the current time or an average work value. Where a work value is a load value, the work value is generated for each of a plurality of body parts (e.g., the back, upper limbs and lower limbs). In the statistical data, for example, the elapsed time from the start time of work is associated with the work value accumulated until the elapsed time or with the average work value.

(Step ST124)

After the statistical data is generated, the display data generation unit 124 generates display data, based on the generated statistical data. Specifically, the display data generation unit 124 generates display data in which accumulated work values included in the statistical data are displayed in correspondence to a plurality of parts of a human body diagram regarded as a worker. In other words, the display data generation unit 124 generates display data in which maps representing load values of a plurality of parts of the worker are superimposed on the human body diagram regarded as the worker.

FIG. 14 is a human body diagram 35 in which load values accumulated in the first embodiment are displayed in correspondence to a plurality of body parts. The human body diagram 35 is divided into a back region 351, an upper limb region 352 and a lower limb region 353 as a plurality of body parts. These regions are color-coded according to the magnitude of the load value, and four load value levels LV1 to LV4 from the lowest load value to the highest load value are shown. Specifically, the back region 351 is colored in the color corresponding to the load value level LV4, the upper limb region 352 is colored in the color corresponding to the load value level LV3, and the lower limb region 353 is colored in the color corresponding to the load value level LV2. Thus, by looking at the human body diagram 35, the user can recognize that the load of the back region 351 is higher than the loads of the other body parts of the worker.

In FIG. 14, the display data is a human body diagram in which the accumulated load values at an arbitrary time are displayed in correspondence to a plurality of body parts, but the display data is not limited to this. For example, the display data may include a plurality of human body diagrams in which the load values accumulated at a plurality of points of time are displayed in correspondence to a plurality of body parts.

Figure 15:
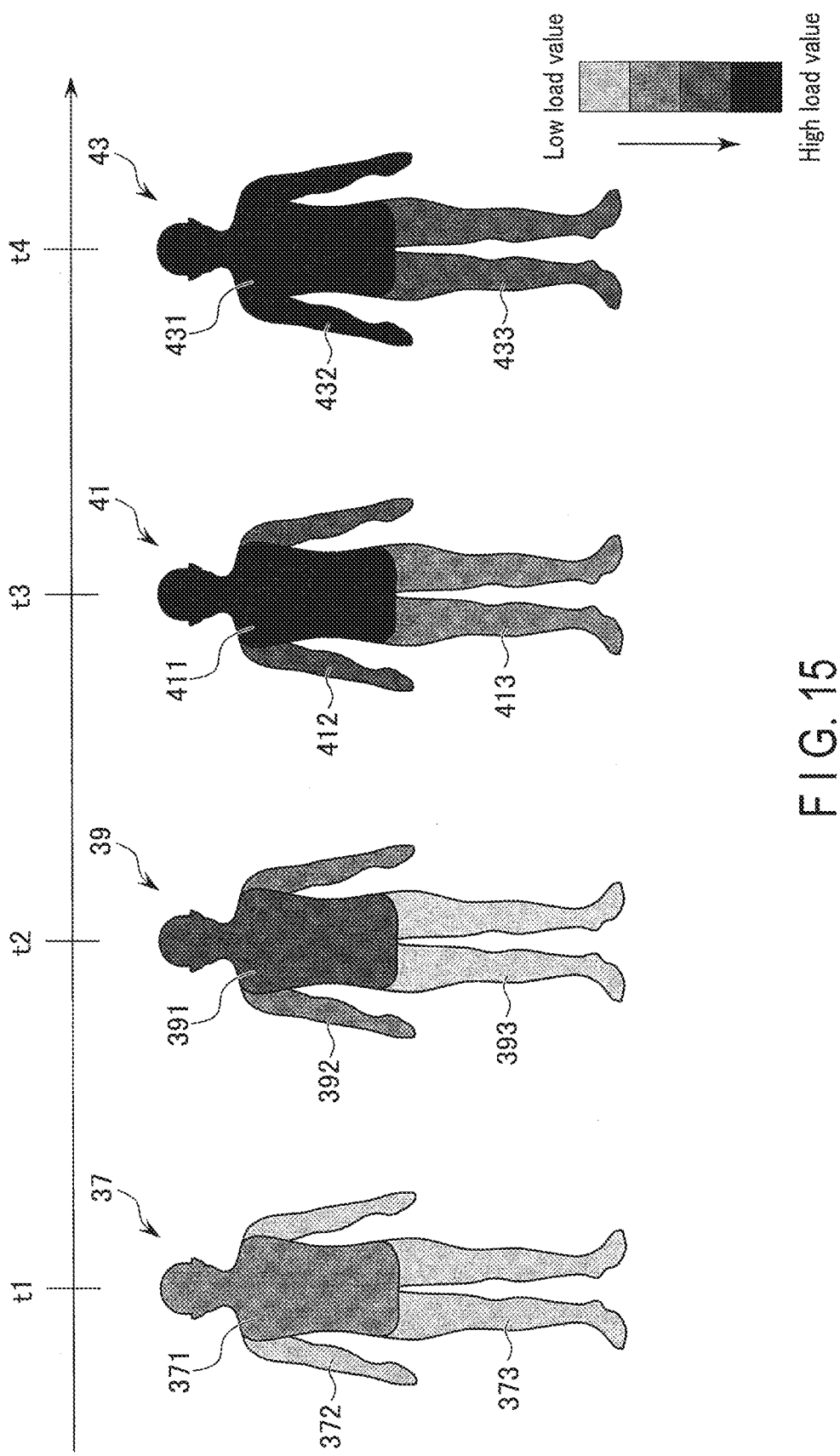
FIG. 15 illustrates a plurality of human body diagrams illustrating how accumulated load values are displayed in correspondence to a plurality of body parts according to the first embodiment, the human body diagrams being arranged in time series.

FIG. 15 illustrates a plurality of human body diagrams 37, 39, 41 and 43 in which load values accumulated in the first embodiment are displayed in correspondence to a plurality of body parts, the human body diagrams being arranged in time series. In FIG. 15, human body diagrams 37, 39, 41 and 43 respectively corresponding to times t1 to t4 are shown.

In the human body diagram 37, the back region 371 is colored in the color corresponding to the load value level LV2, and the upper limb region 372 and the upper limb region 373 are colored in the color corresponding to the load value level LV1. In the human body diagram 39, the back region 391 is colored in the color corresponding to the load value level LV3, the upper limb region 392 is colored in the color corresponding to the load value level LV72, and the lower limb region 393 is colored in the color corresponding to the load value level LV1. In the human body diagram 41, the back region 411 is colored in the color corresponding to the load value level LV4, the upper limb region 412 is colored in the color corresponding to the load value level LV3, and the lower limb region 413 is colored in the color corresponding to the load value level LV2. In the human body diagram 43, the back region 431 and the upper limb region 432 are colored in the color corresponding to the load value level LV4, and the lower limb region 433 is colored in the color corresponding to the load value level LV3. Thus, by looking at the plurality of human body diagrams 37, 39, 41, 43 arranged in time series, the user can grasp how the loads of a plurality of body parts vary with the passage of work time.

The display data according to the first embodiment is not limited to the above-mentioned data. For example, the display data may be created by processing the video data. At this time, the display data generation unit 124 superimposes maps representing load values of a plurality of body parts of the worker on the worker of the video data. Further, numerical values included in the statistical data, figures corresponding to the numerical values, and a table or a graph that is based on the statistical data may be superimposed such that they are shown on the worker of the video data or in the neighborhood thereof.

(Step ST130)

After the display data is generated, the processing unit 120 outputs the display data that is based on the work values to the output device 400. After the processing of step ST130, the work estimation program is ended.

Where the video data is acquired in real time, the process flow may return to step ST110 after the processing of step ST130, and the subsequent processes may be repeated. The work estimation program may be ended in response to an instruction by the user.

As described above, the work estimation apparatus 100 according to the first embodiment acquires video data relating to a predetermined area, calculates a work value of the work performed by the worker included in the video data, based on the acquired video data, and displays the calculated work value. This work value may include, for example, a load value that represents the physical load which the work imposes or the worker. Further, the work estimation apparatus 100 according to the first embodiment may estimate a working posture of the worker, may specify a posture of a body part of the worker, and may superimpose a map representing a load value on a human body diagram regarded as a worker.

Therefore, the work estimation apparatus 100 according to the first embodiment uses an image and enables the work state of a worker to be visually grasped at a lower introduction cost than a conventional work value estimation using a sensor. In addition, the work estimation apparatus 100 according to the first embodiment can visualize the work load related to a body part of the worker, and work improvement of the worker is thus enabled.

Second Embodiment

In connection with the first embodiment, reference was made to the case where a work value (e.g., a load value) of the worker is calculated from the video data. On the other hand, in connection with the second embodiment, a description will be given of the case where a work target of the work performed by the worker is estimated.

FIG. 16 is a block diagram showing a configuration example of the work estimation system 1A including the work estimation apparatus 100A according to the second embodiment. The work estimation system 1A includes a work estimation apparatus 100A, a photographing device 200A, a storage device 300A and an output device 400A. Since the photographing device 200A and the output device 400A are substantially similar to the photographing device 200 and output device 400 of the first embodiment, a description thereof will be omitted.

The storage device 300A is a computer-readable storage medium that stores data in a nonvolatile manner. The storage device 300A stores video data output from the photographing device 200A. Further, the storage device 300A stores, for example, a plurality of data used in the work estimation apparatus 100A. The plurality of data of the second embodiment include, for example, work target estimation data, in addition to the plurality of data of the first embodiment. Details of the work target estimation data will be described later. The storage device 300A outputs video data and a plurality of data to the work estimation apparatus 100A in response to access from the work estimation apparatus 100A.

The work estimation apparatus 100A is, for example, a computer used by a user who manages the work estimation system 1A. The work estimation apparatus 100A includes an acquisition unit 110A, a processing unit 120A and a display control unit 130A. The work estimation apparatus 100A may include at least one of a photographing device 200A, a storage device 300A and an output device 400A. Since the acquisition unit 110A and the display control unit 130A are substantially similar to the acquisition unit 110 and display control unit 130 of the first embodiment, a description thereof will be omitted.

The processing unit 120A receives video data from the acquisition unit 110A. The processing unit 120A calculates a work value related to a posture of the worker (working posture), based on the video data. Further, the processing unit 120A estimates a work target of the work performed by the worker, based on the video data and the information on the working posture of the worker. By accessing the storage device 300A, the processing unit 120A may receive a plurality of data necessary for processing the video data. The processing unit 120A may cause the storage device 300A to store the calculated work value and the estimated work target information as they are, or may cause the storage device 300A to store the calculated work value and the estimated work target information in association with video data or video data information.

Further, the processing unit 120A generates display data in an expression format that is easy for the user to recognize, based on the calculated work value and the estimated work target. For example, the display data of the second embodiment permits the statistical data of the calculated work value to be displayed for the work target shown in a sketch of a work area. Specifically, the display data of the second embodiment superimposes a map corresponding to statistical data on one or more work targets in a two-dimensional or three-dimensional sketch. The processing unit 120A outputs the generated display data to the display control unit 130A. The processing unit 120A may cause the storage device 300A to store the generated display data as it is, or may cause the storage device 300A to store the generated display data in association with the video data or the video data information. Further, the display data may include numerical values included in the statistical data, figures corresponding to the numerical values, and a table or a graph that is based on the statistical data, such that they are shown on the sketch or in the neighborhood thereof.

FIG. 17 is a block diagram showing a configuration of the processing unit 120A of the work estimation apparatus 100A according to the second embodiment. The processing unit 120A includes a posture estimation unit 121A, a work value calculation unit 122A, a statistical processing unit 123A, a display data generation unit 124A and a work target estimation unit 125. Since the work value calculation unit 122A is substantially similar to the work value calculation unit 122 of the first embodiment, a description thereof will be omitted.

The posture estimation unit 121A estimates a posture cf a worker, based on the video data. Specifically, the posture estimation unit 121A detects a worker from the video data, using the posture estimation data, and estimates a posture of the detected worker. The posture estimation unit 121A outputs information on the estimated posture of the worker to the work value calculation unit 122A and the work target estimation unit 125.

The work target estimation unit 125 receives information on the posture of the worker from the posture estimation unit 121A. The work target estimation unit 125 estimates a work target of the work performed by the worker, based on the video data, the posture of the worker and the work target estimation data. Specifically, the work target estimation unit 125 identifies the position of the worker included in the video data on a sketch included in the work target estimation data, and estimates a work target of the work performed by the worker from a plurality of work target candidates associated with the sketch, based on the posture of the worker. The work target estimation unit 125 outputs information on the estimated work target to the statistical processing unit 123A.

The work target estimation data includes, for example, a two-dimensional sketch of a work area, a three-dimensional sketch of the work area, etc. The work target estimation data may include a region of coordinates including the work target on the sketch, rectangular position information on the work target, segmentation information on the work target, a name of the work target, etc.

The work target estimation unit 125 may detect, from the video data, the rectangular position information on the work target, segmentation information thereon, or both. In this case, the work target estimation data may include a learned learning model trained to detect an object from the video data.

The statistical processing unit 123A receives a work value of the worker from the work value calculation unit 122A, and receives information on the work target from the work target estimation unit 125. The statistical processing unit 123A generates statistical data regarding the work value of the worker, based on the work value and the work target. Specifically, the statistical processing unit 123 generates, as statistical data, work values accumulated from the start time of work to an arbitrary time, for each work target. The accumulated work values may be generated, for example, for each of a plurality of body parts. The statistical processing unit 123A outputs the generated statistical data to the display data generation unit 124A. The statistical processing unit 123A may generate statistical data, based on historical data.

The display data generation unit 124A receives statistical data from the statistical processing unit 123A, and receives information on the work target from the work target estimation unit 125. The display data generation unit 124A generates display data, based on the statistical data and the information on the work target. Specifically, the display data generation unit 124A uses display conversion data and converts the statistical data and the information on the work target into display data to be displayed in an expression format that is easy for the user to recognize. More specifically the display data generation unit 124A generates display data in which the accumulated work values included in the statistical data are displayed in correspondence to the work target shown in the sketch of the work area.

The display conversion data of the second embodiment includes, for example, a two-dimensional sketch of the work area, a three-dimensional sketch of the work area, and a GUI that displays a sketch and a human body diagram side by side, in addition to the display conversion data of the first embodiment.

The work estimation apparatus 100A may include a memory and a processor (neither is shown). The memory stores, for example, various programs related to the operation of the work estimation apparatus 100A (e.g., a work estimation program). The processor realizes each function of the acquisition unit 110A, the processing unit 120A and the display control unit 130A by executing various programs stored in the memory. The work estimation program according to the second embodiment may include part or all of the processes of the work estimation program of the first embodiment.

The configuration of the work estimation system 1A and the work estimation apparatus 100A according to the second embodiment has been described above. Next, the operation of the work estimation apparatus 100A will be described with reference to the flowchart of FIG. 18.

Figure 18:
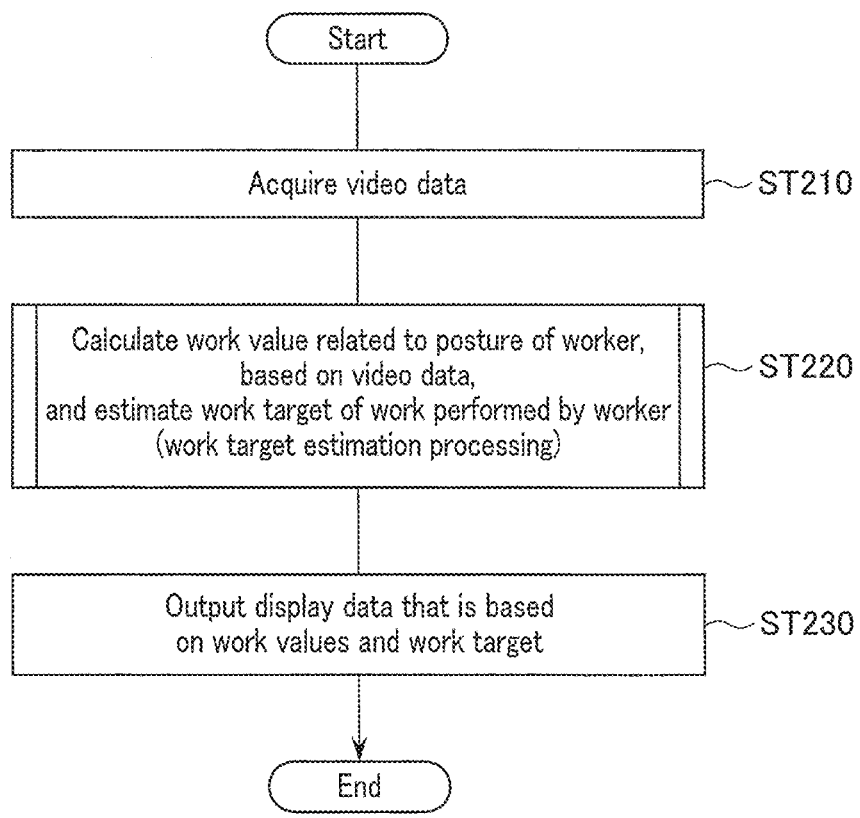
FIG. 18 is a flowchart showing an operation example of the work estimation apparatus according to the second embodiment.

FIG. 18 is a flowchart showing an operation example of the work estimation apparatus 100A according to the second embodiment. The process of the flowchart of FIG. 18 starts when the work estimation program is executed by the user.

(Step ST210)

When the work estimation program is executed, the acquisition unit 110A acquires video data from the storage device 300A. The acquisition unit 110A outputs the acquired video data to the processing unit 120A.

(ST220)

After the video data is acquired, the processing unit 120A calculates a work value related to the posture of the worker, based on the video data, and estimates a work target of the work performed by the worker. In addition, the processing unit 120A generates display data that is based on the work value and the work target. In the description below, the processing of step ST220 will be referred to as "work target estimation processing." A specific example of the work target estimation processing will be described with reference to the flowchart of FIG. 19. The work target estimation processing may include part or all of the work value calculation processing according to the first embodiment.

Figure 19:
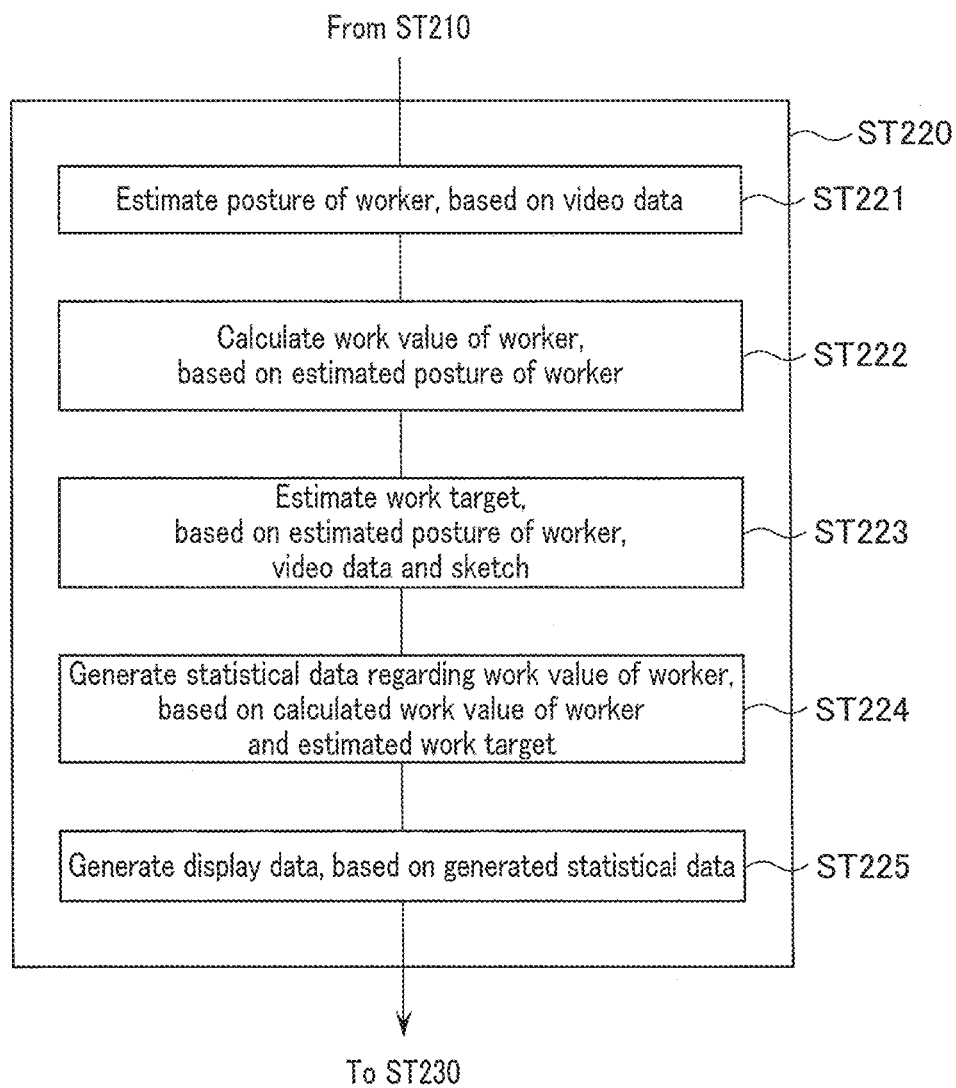
FIG. 19 is a flowchart showing a specific example of how the work target estimation processing is performed according to the second embodiment.

FIG. 19 is a flowchart showing a specific example of the work target estimation processing according to the second embodiment. The flowchart of FIG. 19 illustrates details of the processing of step ST220 shown in FIG. 18. Since the processing of steps ST221 and ST222 is substantially similar to the processing of steps ST121 and ST122 of the first embodiment, a description thereof will be omitted.

(Step ST223)

After the work value of the worker is calculated, the work target estimation unit 125 estimates a work target, based on the estimated posture of the worker, the video data and the sketch. In the specific example described below, the work target estimation unit 125 performs undermentioned processing, based on the video data captured by the photographing device 200A arranged diagonally above the work area. First, an example of an image of video data and an example of a two-dimensional sketch will be described with reference to FIGS. 20 and 21.

Figure 20:
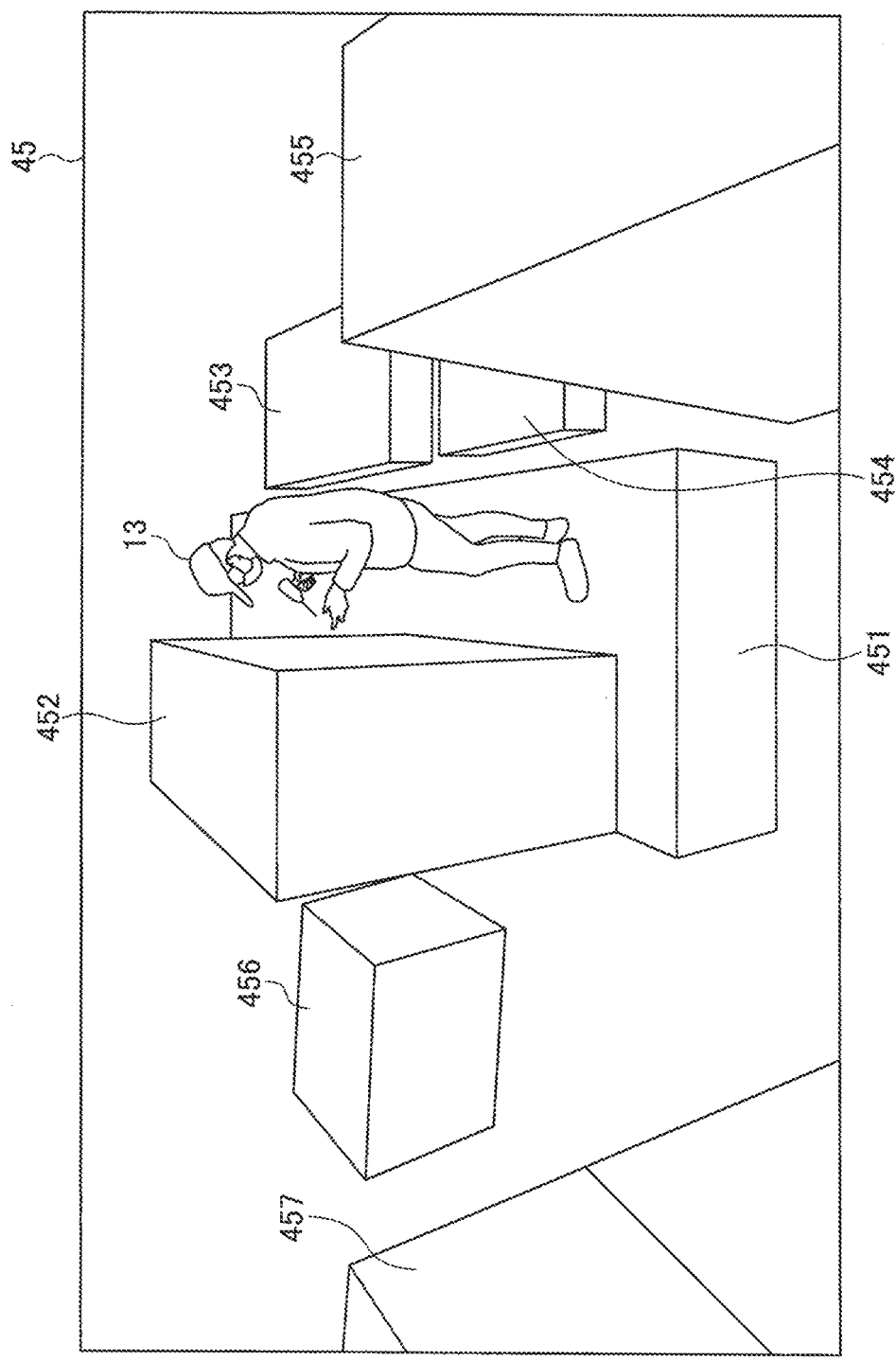
FIG. 20 is a diagram illustrating an image of video data according to the second embodiment.

FIG. 20 is a diagram illustrating how image 45 of video data according to the second embodiment. The image 45 shows a work area. The work area includes, for example, a working step 451, a pre-assembly product 452, a parts storage 453, a parts storage 454, an assembled product 455, a parts shelf 456 and a parts shelf 457. In the description below, each of the pre-assembly product 452, parts storage 453, parts storage 454, assembled product 455, parts shelf 456 and parts shelf 457 may be paraphrased as a work target.

The image 45 shows a worker 13 in the work area. The worker 13 is on the working step 451 and faces the pre-assembly product 452. The pre-assembly product 452 is placed on the working step 451. The working step 451, the parts storage 453, the parts storage 454, the assembled product 455, the parts shelf 456 and the parts shelf 457 are arranged in the same plane (e.g., on the floor), with intervals therebetween.

Figure 21:
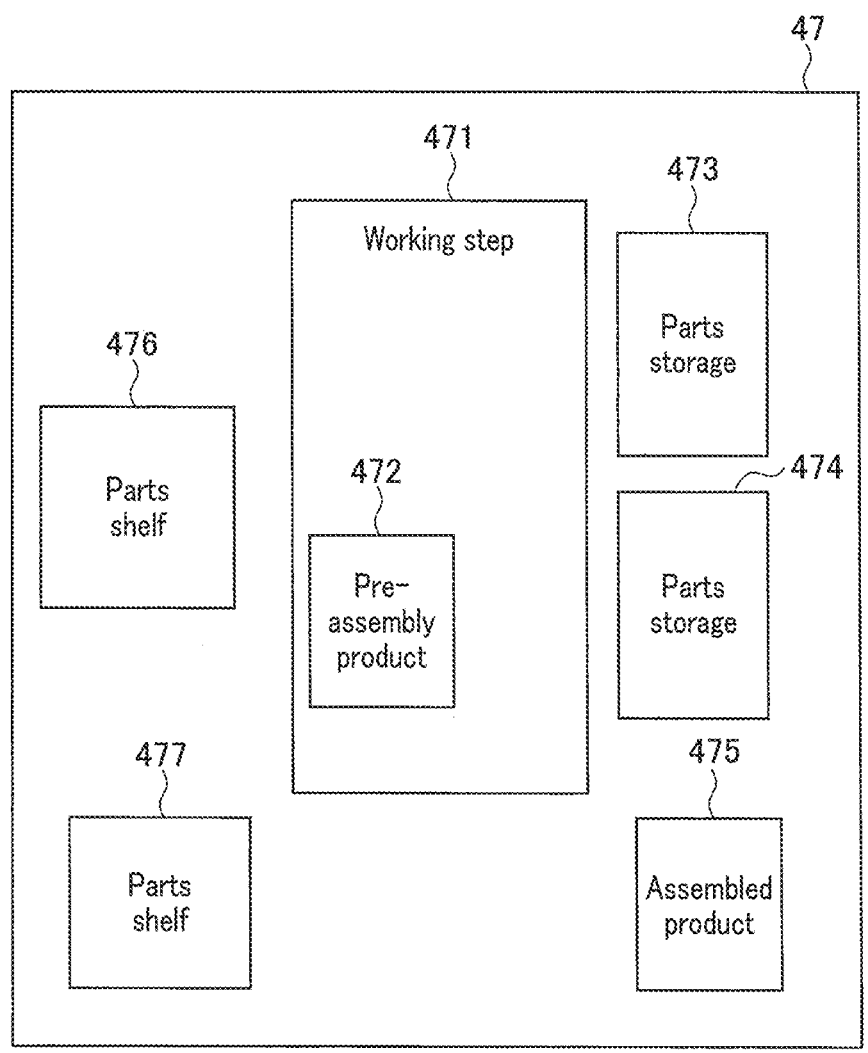
FIG. 21 is a diagram illustrating a two-dimensional sketch according to the second embodiment.

FIG. 21 is a diagram illustrating a two-dimensional sketch 47 according to the second embodiment. The sketch 47 shows a work area. The sketch 47 shows the working step 471, the pre-assembly product 472, the parts storage 473, the parts storage 474, the assembled product 475, the parts shelf 476 and the parts shelf 477 such that the work area in the sketch 47 corresponds to the work area shown in the image 45. Further, the pre-assembly product 472, the parts storage 473, the parts storage 474, the assembled product 475, the parts shelf 476 and the parts shelf 477 correspond to one or more work target candidates. Where the position of a work target candidate is specified from the sketch, a table may be used in which the work target candidate and the coordinate points indicative of the area of the work target candidate on the sketch are associated with each other.

Next, the processing performed by the work target estimation unit 125 will be described in detail. First, the work target estimation unit 125 associates an image of video data with a two-dimensional sketch. Specifically, the work target estimation unit 125 acquires coordinate data on reference points of the image 45 and coordinate data on reference points of the sketch 47, the reference points being common portions in the work area. Those coordinate data may be included in the work target estimation data in advance.

Figure 22:
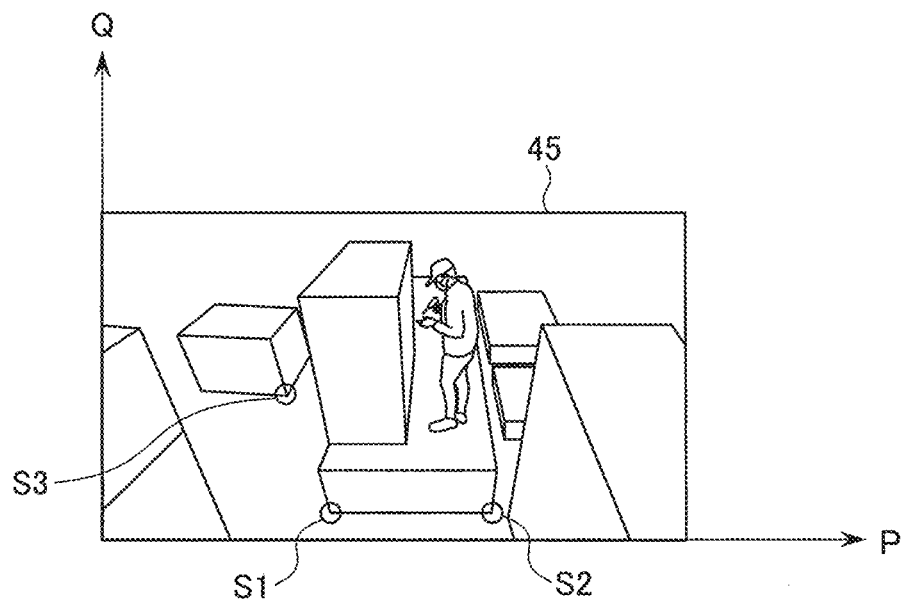
FIG. 22 is a diagram illustrating three reference points in the image shown in FIG. 20.

FIG. 22 is a diagram illustrating three reference points in the image 45 shown in FIG. 20. In 22, the image 45 is arranged on two-dimensional coordinates (Q, P). Three reference points S1 to S3 are shown on the image 45. These three reference points S1 to S3 are determined such that the floor in the work area can be defined. Specifically, the three reference points S1 to S3 are determined such that they do not line up in a plane corresponding to the floor of the work area.

Figure 23:
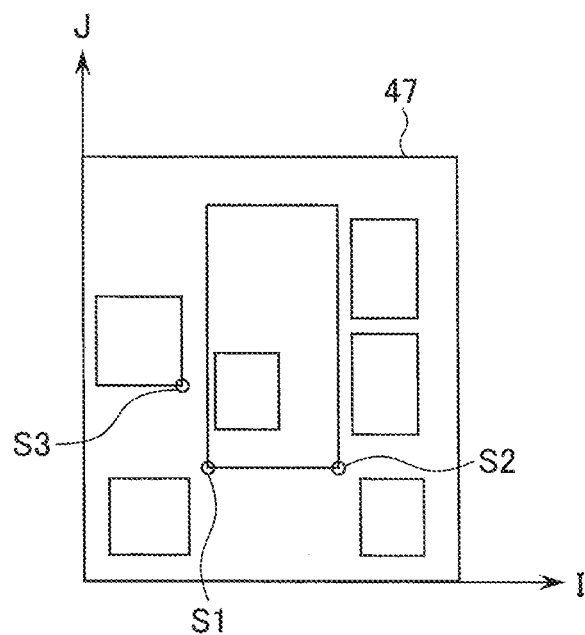
FIG. 23 is a diagram illustrating three reference points in the sketch shown in FIG. 21.

FIG. 23 is a diagram illustrating the three reference points in the sketch shown in FIG. 21. In FIG. 23, the sketch 47 is arranged on two-dimensional coordinates (I, J). Similar to the image 45 of FIG. 22, three reference points S1 to S3 are shown on the sketch 47. The reference points in FIG. 23 are determined such that they correspond to the reference points in FIG. 22.

Figure 24:
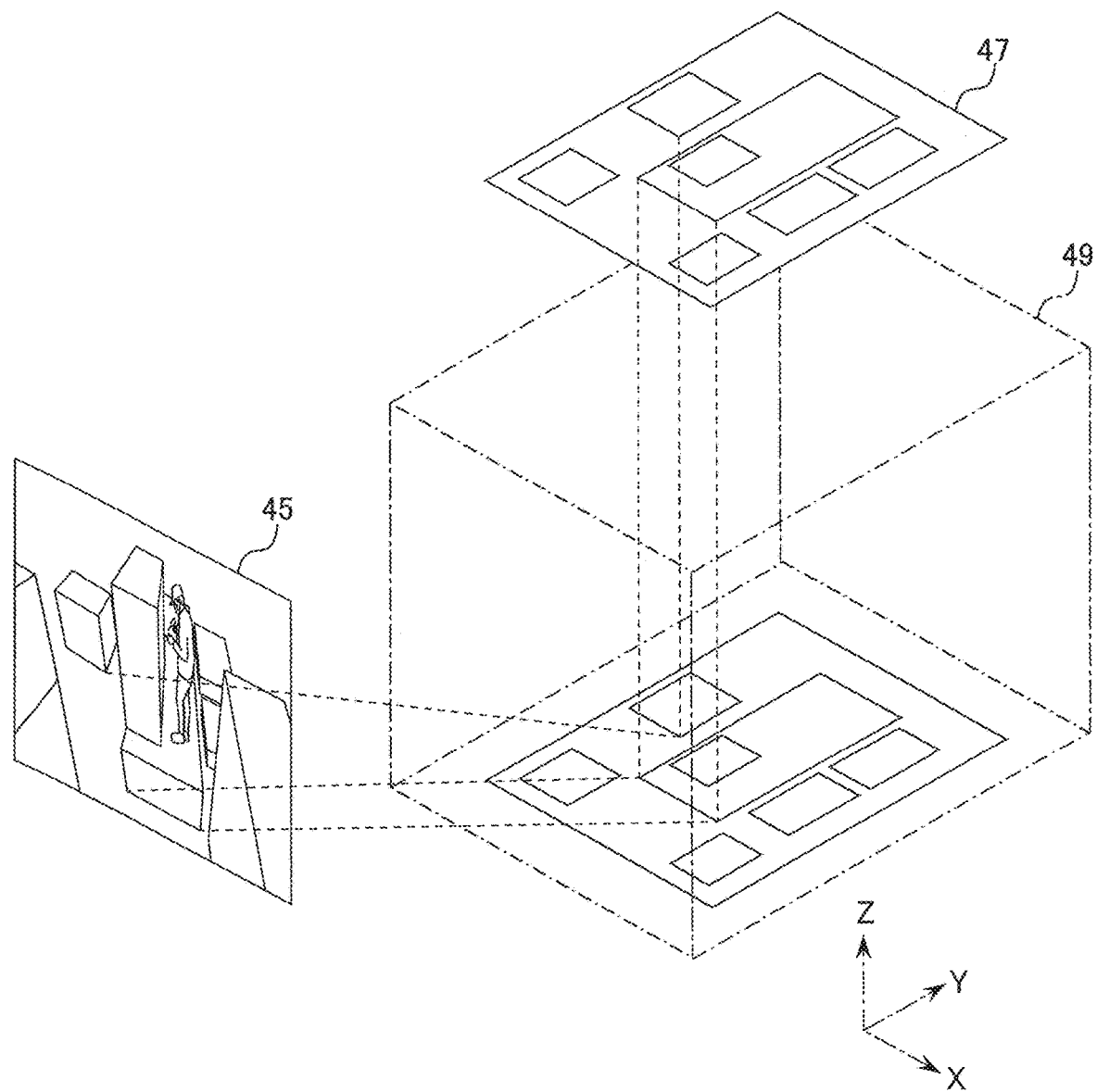
FIG. 24 is a diagram for illustrating how the image shown in FIG. 20 and the sketch shown in FIG. 21 are related to virtual three-dimensional space.

FIG. 24 is a diagram for illustrating how the image 45 shown in FIG. 20 and the sketch 47 shown in FIG. 21 are related to virtual three-dimensional space 49. The work target estimation unit 125 uses perspective projection transformation such that the three reference points in the image 45 and the three reference points in the sketch 47 coincide with each other on the virtual three-dimensional space 49. Specifically, the work target estimation unit 125 projects the sketch 47 in parallel in a zero-height XY plane of the virtual three-dimensional space 49. Then, the work target estimation unit 125 projects the virtual three-dimensional space 49 onto a two-dimensional plane by use of a virtual camera, and arranges the virtual three-dimensional space 49 such that the parallel-projected reference points on the sketch coincide with the positions of the reference points in the image 45.

FIG. 25 is a diagram illustrating how the coordinates of the reference points in the image 45 and the coordinates of the reference points in the sketch 47 are converted to coordinates of reference points in the virtual three-dimensional space 49 according to the second embodiment. In the table 51 shown in FIG. 25, the coordinates of the three reference points S1 to S3 in the image 45 and those in the sketch 47 are associated with each other. The coordinates of the reference points S1 to S3 of the image 45 are indicated by (P1, Q1), (P2, Q2) and (P3, Q3), respectively, and the coordinates of the reference points S1 to S3 of the sketch. 47 are indicated by (I1, J1), (I2, J2) and (I3, J3), respectively.

The work target estimation unit 125 converts the coordinates of the reference points shown in the table 51 into the coordinates in the virtual three-dimensional space 49; based on the perspective projection transformation 53. The table 55 in FIG. 25 shows how the coordinates of the three reference points S1 to S3 are in the virtual three-dimensional space 49. The coordinates of the three reference points S1 to S3 in the virtual three-dimensional space 49 are indicated by (X1, Y1, Z1) (X2, Y2, Z2) and (X3, Y3, Z3), respectively. Since these three reference points S1 to S3 are determined in the zero-height XY plane of the virtual three-dimensional space 49, the values of Z1, Z2 and Z3 indicative of the height are all zero.

The working step 471 is not at the same height as the floor in the work area. Therefore, a reference point that can define the working step 471 is determined in both the image and the sketch, and is associated differently from the reference points on the floor in the work area. In the description below, it is assumed that the floor in the work area and the working step 471 are distinguished and the image of the video data and the two-dimensional sketch are associated with each other.

After the image of the video data and the two-dimensional sketch are associated with each other, the work target estimation unit 125 arranges a three-dimensional human skeleton model represented by normalized three-dimensional coordinates in the virtual three-dimensional space. Specifically, the work target estimation unit 125 converts the normalized three-dimensional coordinates of the three-dimensional human skeleton model used for the posture estimation into coordinates of the virtual three-dimensional space.

FIG. 26 is a diagram for illustrating how the three-dimensional human skeleton model 17 represented by the normalized three-dimensional coordinates is arranged in the virtual three-dimensional space 49 according to the second embodiment. The work target estimation unit 125 converts the three-dimensional human skeleton model 17 into a three-dimensional human skeleton model 59 represented in the virtual three-dimensional space 49, based on coordinate conversion 57. The coordinate conversion 57 utilizes the association between the image 45 and the virtual three-dimensional space 49.

Specifically, the work target estimation unit 125 uses the key points KP17 and KP18 of the three-dimensional human skeleton model 17 and the corresponding coordinates on the image 45, and identifies the coordinates of the key points KP17 and KP18 in the virtual three-dimensional space 49. Since the key points KP17 and KP18 correspond to the "right foot" and the "left foot", respectively, they can be reference points of the three-dimensional human skeleton model 17. Thereafter, the work target estimation unit 125 calculates coordinates of each key point of the three-dimensional human skeleton model 59 from the coordinates of each key point of the three-dimensional human skeleton model 17, based on the identified coordinates of the key points KP17 and KP18 in the specified virtual three-dimensional space 49.

Figure 27:
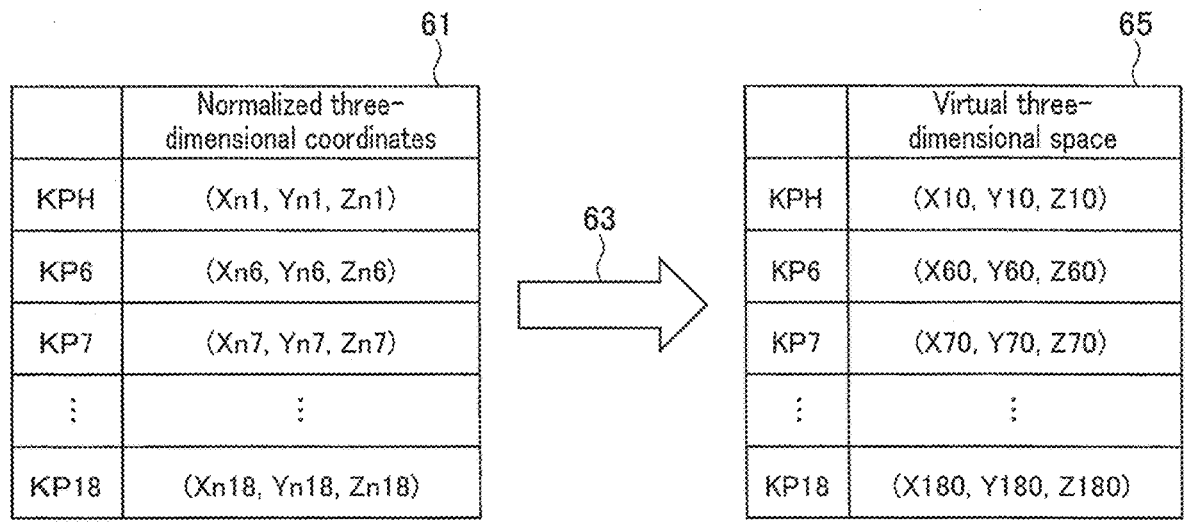
FIG. 27 is a diagram illustrating how the coordinates of key points of the three-dimensional human skeleton model represented by the normalized three-dimensional coordinates are converted to the coordinates of the key points of the three-dimensional human skeleton model represented in the virtual three-dimensional space according to the second embodiment.

FIG. 27 is a diagram illustrating how the coordinates of key points of the three-dimensional human skeleton model 17 represented by the normalized three-dimensional coordinates are converted into the coordinates of the key points of the three-dimensional human skeleton model 59 represented in the virtual three-dimensional space according to the second embodiment. In the table 61 shown in FIG. 27, the coordinates of the 14 key points KPH, KP6, KP7, . . . , KP18 of the three-dimensional human skeleton model 17 are shown. The coordinates of the key points KPH, KP6, KP7, . . . , KP18 in the normalized three-dimensional coordinates are (Xn1, Yn1, Zn1), (Xn6, Yn6, Zn6), (Xn7, Yn7, Zn7), . . . , (Xn18, Yn18, Zn18), respectively. In the table 65 shown in FIG. 27, the coordinates of the 14 key points KPH, KP6, KP7, . . . , KP18 of the three-dimensional human skeleton model 59 are shown. The coordinates of the key points KPH, KP6, KP7, . . . , KP18 in the virtual three-dimensional space 49 are (X10, Y10, Z10), (X60, Y60, Z60), (X70, Y70, Z70), . . . , (X180, Y180, Z180), respectively.

The work target estimation unit 125 converts the coordinates shown in the table 61 into the coordinates shown in the table 65, based on coordinate conversion 63. The coordinate conversion 63 is similar to the coordinate conversion 57.

After the three-dimensional human skeleton model represented by the normalized three-dimensional coordinates is arranged in the virtual three-dimensional space, the work target estimation unit 125 estimates the direction of the worker represented by the three-dimensional human skeleton model. Specifically, the work target estimation unit 125 calculates a direction of the vector corresponding to the direction of the worker from the coordinates of the key points of the three-dimensional human skeleton model arranged in the virtual three-dimensional space.

Figure 28:
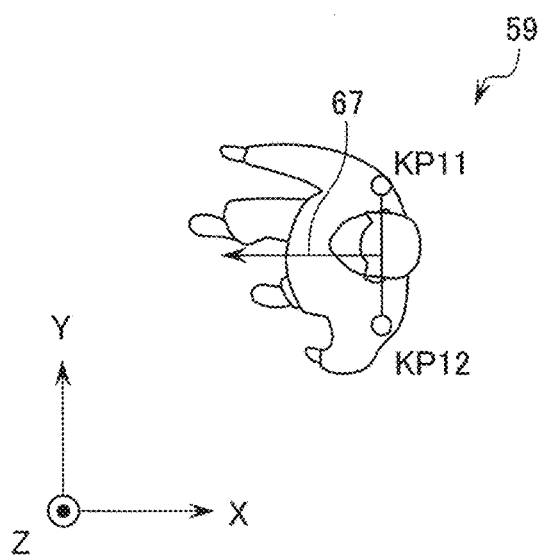
FIG. 28 is a diagram for illustrating how the direction of the worker is estimated according to the second embodiment.

FIG. 28 is a diagram for illustrating how the direction of the worker is estimated according to the second embodiment. FIG. 28 shows how a worker represented by the three-dimensional human skeleton model 59 looks like when viewed in the height direction (Z-axis direction) of the virtual three-dimensional space. The work target estimation unit 125 calculates a direction of the vector v7 representing the front direction 67 of the worker from the coordinates of the key points KP11 and KP12 of the three-dimensional human skeleton model 59. Specifically, the work target estimation unit 125 uses the coordinates (X110, Y110, Z110) of the key point KP11 and the coordinates (X120, Y120, Z120) of the key point KP12 in the virtual three-dimensional space and calculates a direction of the vector v7 from the midpoint between the coordinates (X110, Y110) and the coordinates (X120, Y120) in the XY plane. The direction of the vector v7 can be represented by ((−1/(Y110−Y120)), 1/(X110−X120)).

Where the direction of the worker is estimated on a three-dimensional sketch, the work target estimation unit 125 calculates a direction vector representing the front direction of the body of the worker by calculating a vector v10 represented by the outer product of a vector v8 representing the direction from the midpoint between the hips to the right shoulder in the three-dimensional human skeleton model 59 and a direction vector v9 from that midpoint to the left shoulder.

After the direction of the worker represented by the three-dimensional human skeleton model is estimated, the work target estimation unit 125 estimates a work target of the work performed by the worker from one or more work target candidates, based on the direction of the worker and the sketch in which one or more work target candidates are associated.

FIG. 29 is a diagram for illustrating how the direction of the worker is associated with the work targets in the sketch according to the second embodiment. FIG. 29 shows how the sketch 69 projected on the virtual three-dimensional space looks like when viewed in the height direction. FIG. 29 shows the sketch 69 and a worker 71 on the sketch 69. In the sketch 69, a work target candidate point 731 indicative of a work target is associated as a coordinate point at an arbitrary position in the region of the pre-assembly product 73. The work target candidate point 731 is associated with the pre-assembly product 73. It is assumed that the position and direction of the worker 71 are already specified in the virtual three-dimensional space.

FIG. 29 shows a fan-shaped work target area 711 in which the position of the worker 71 is an apex and the direction of the worker 71 (e.g., the direction of the vector v7 in FIG. 28) is a reference. The fan-shaped arc shown as the work target area 711 is determined based on, for example, the physical characteristics of the worker. The physical characteristics of the worker are, for example, the arm length of a specific worker or the average arm length of a plurality of workers. Preferably, the work target area 711 is an area within the reach of both hands of the operator. The work target estimation unit 125 estimates that the pre-assembly product 73 associated with the work target candidate point 731 is a work target by specifying the work target candidate point 731 included in the work target area 711. The work target area is not limited to the fan shape, and may be a circle, a rectangle, or the like.

Although not depicted in the example shown in FIG. 29, work target candidate points are associated with other work target candidates (e.g., a parts storage and a parts shelf) as coordinate points at arbitrary positions in the areas indicative of the work target candidates. As the work target candidate points, the positions that can be associated with the work target candidates may be determined in consideration of the range in which the work target areas overlap.

The estimation of the work target is not limited to the example shown in FIG. 29. For example, the work target estimation unit 125 may use part or all of the area indicative of a work target candidate as a work target candidate area, and may estimate a work target according to the degree of agreement with the work target area of the worker.

If the direction of the worker is associated with the work target shown in the sketch on a three-dimensional sketch, the work target estimation unit 125 determines a triangle defined by three points in the three-dimensional human skeleton model (worker 71), which are the coordinate point of the right shoulder, the coordinate point of the right shoulder and the coordinate point of the midpoint of the hips, and determines an axis extending from the center of gravity of that triangle in the direction of the vector v10. Then, the work target estimation unit 125 calculates a conical three-dimensional region, a spherical three-dimensional region or a rectangular three-dimensional region centered on the determined axis, as a work target area. In an alternative example, the work target estimation unit 125 may calculate spherical three-dimensional regions centered on the right hand and the left hand of the three-dimensional human skeleton model, as work target areas.

(Step ST224)

After the work value of the worker is calculated and the work target is estimated, the statistical processing unit 123A generates statistical data regarding the work value of the worker, based on the calculated work value of the worker and the estimated work target specifically, the statistical processing unit 123A generates, as statistical data, work values accumulated from the start time of work to an arbitrary point of time or an average work value, for each work target. Alternatively, the statistical processing unit 123A may generate statistical data in which a load value level and a work time are associated with each other for each work target. In the specific example described below, it is assumed that the statistical data is data in which a load value level and a work time are associated with each other for each work target.

(Step ST225)

After the statistical data is generated, the display data generation unit 124A generates display data, based on the generated statistical data. Specifically, the display data generation unit 124A generates display data in which a load value map corresponding to the generated statistical data is superimposed on the sketch.

The load value map is represented, for example, by a combination of circles which are based on respective work targets. The radial length of each circle corresponds to the work time according to the load value level, and the shade of each circle corresponds to a load value level. The load value map may be paraphrased as a color map or a heat map.

Figure 30:
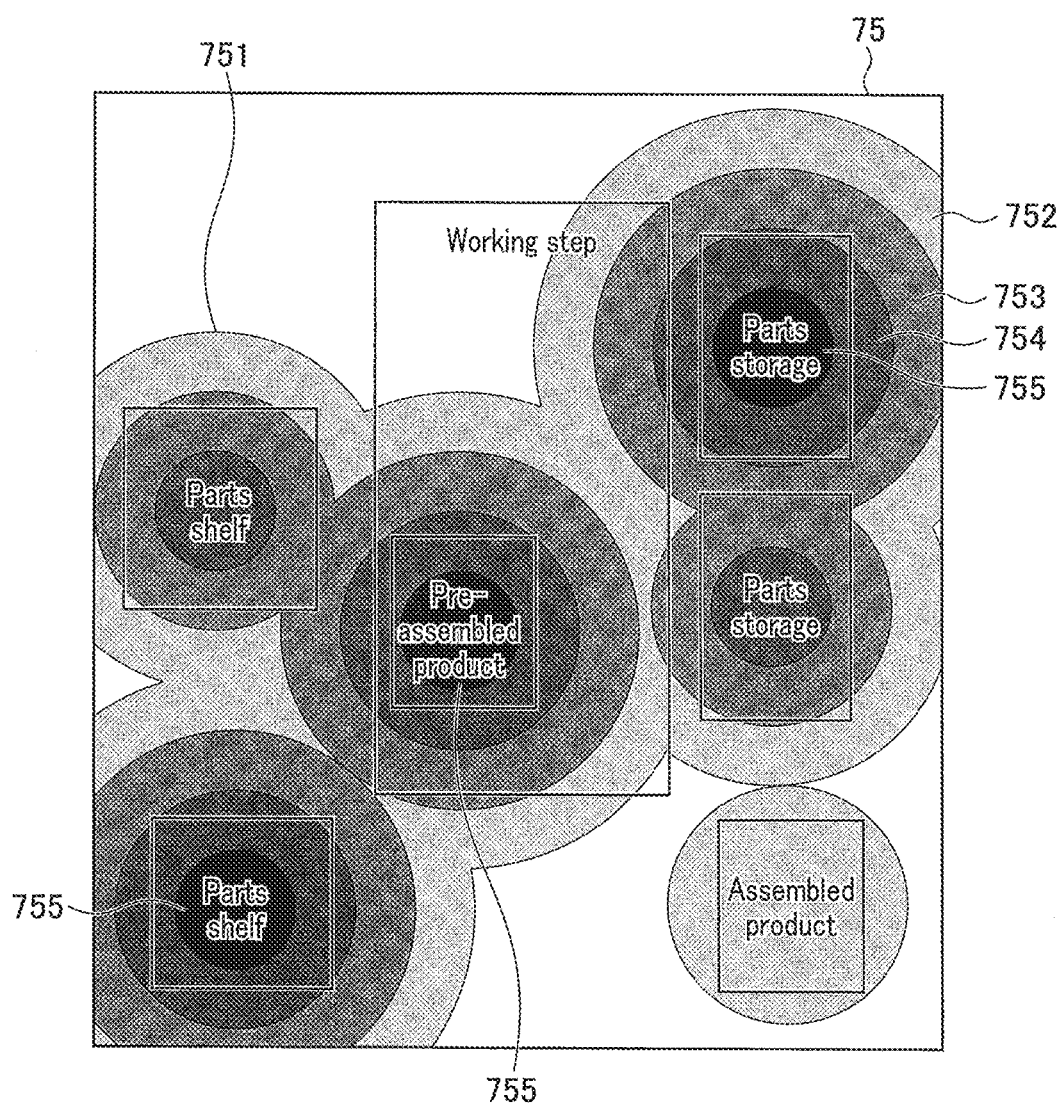
FIG. 30 is a sketch illustrating how accumulated load values are displayed in correspondence to a plurality of work targets according to the second embodiment.

FIG. 30 is a sketch 75 illustrating how accumulated load values are displayed in correspondence to a plurality of work targets according to the second embodiment. The load value map 751 is superimposed on the sketch 75. The load value map 751 includes, for example, four load areas 752 to 755 corresponding to the load value levels. The load area 752 corresponds to the load value level LV1 and has the widest contour. The load area 753 corresponds to the load value level LV2 and has a contour narrower than the load areas 752. The load area 754 corresponds to the load value level LV3 and has a contour narrower than the load area 753. The load area 755 corresponds to the load value level LV4 and has a contour narrower than the load area 754. The contour of the load value map 751 is the same as the contour of the load area 752.

Specifically, in the sketch 75 shown in FIG. 30, the load area 755 are shown with respect to the parts storage located at the upper right (corresponding to the parts storage 473 in the sketch 47 shown in FIG. 21), the pre-assembly product, and the parts shelf located at the lower left (corresponding to parts shelf 477 in the sketch 47 shown in FIG. 21). Therefore, the user who looks at the sketch 75 can recognize that the work performed for these work targets imposes a heavy load on the worker. The sketch 75 on which the load value map 751 is superimposed may be paraphrased as display data.

In FIG. 30, the sketch 75 in which the accumulated load values are displayed correspondence to a plurality of work targets is used as the display data, but the display data not limited to this. For example, the display data may be data that includes a human body diagram showing a specific body part and a sketch showing a load value related to the specific body part in correspondence to a plurality of work targets.

Figure 31:
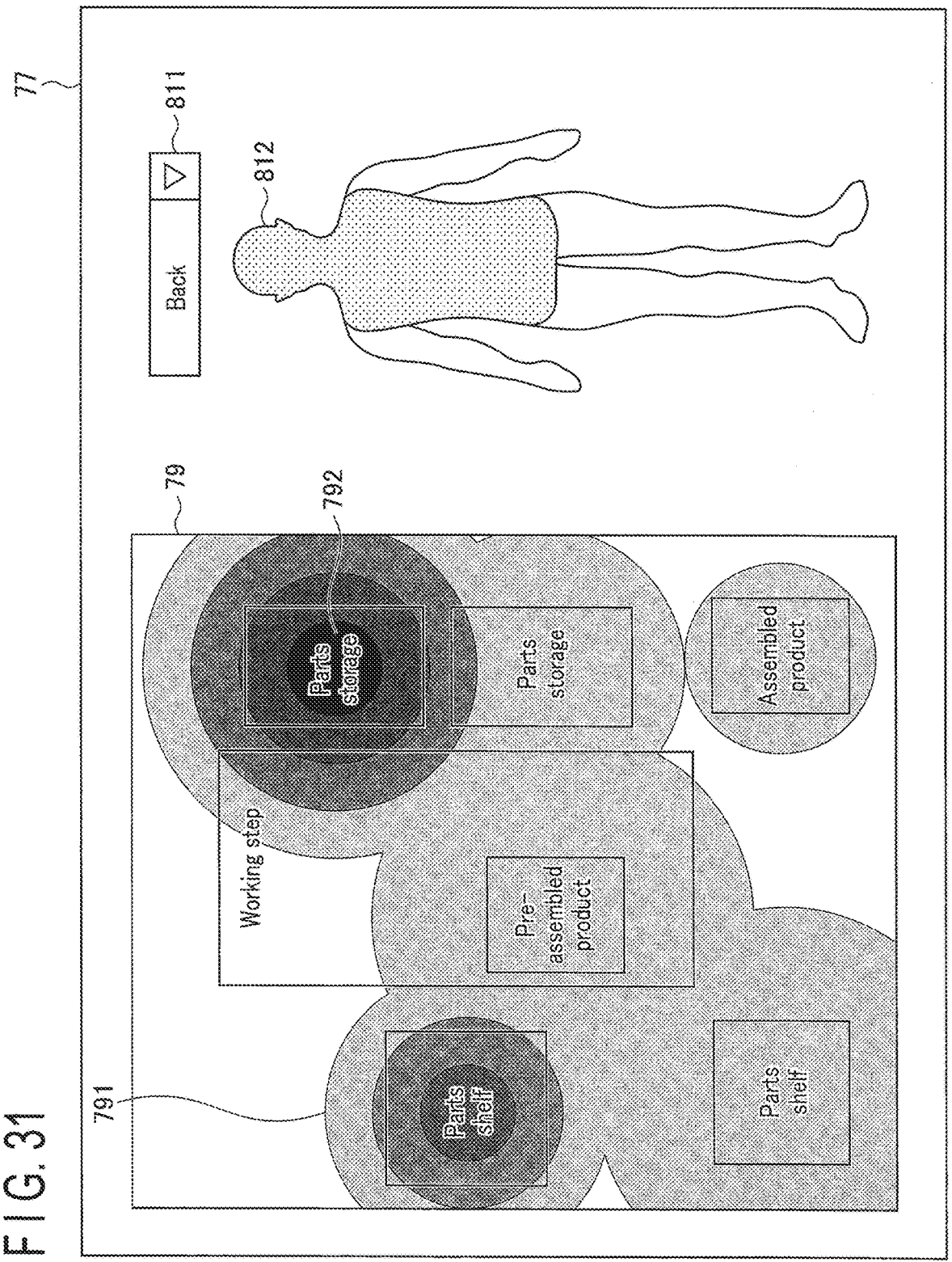
FIG. 31 is a diagram illustrating a first specific example of display data obtained according to the second embodiment and including a human body diagram showing a specific body part and a sketch showing load values related to the specific body part and displayed in correspondence to a plurality of work targets.

FIG. 31 is a diagram illustrating a first specific example of display data 77 obtained according to the second embodiment and including a human body diagram 812 showing a specific body part and a sketch 79 showing load values related to the specific body part and displayed in correspondence to a plurality of work targets. The display data 77 is a GUI including the sketch 79, a pull-down menu 811 and the human body diagram 812.

When the user selects, for example, the body part "back" from the pull-down menu 811, the back region is colored in the human body diagram 812, and the load value map 791 regarding the "back" is superimposed on the sketch 79. At this time, the load area 792 corresponding to the load value level LV4 is displayed in the parts storage (corresponding to the parts storage 473 in the sketch 47 shown in FIG. 21) located at the upper right. Therefore, the user who looks at the sketch 77 can recognize that the work performed for the parts storage imposes a heavy load on the "back" of the worker.

Figure 32:
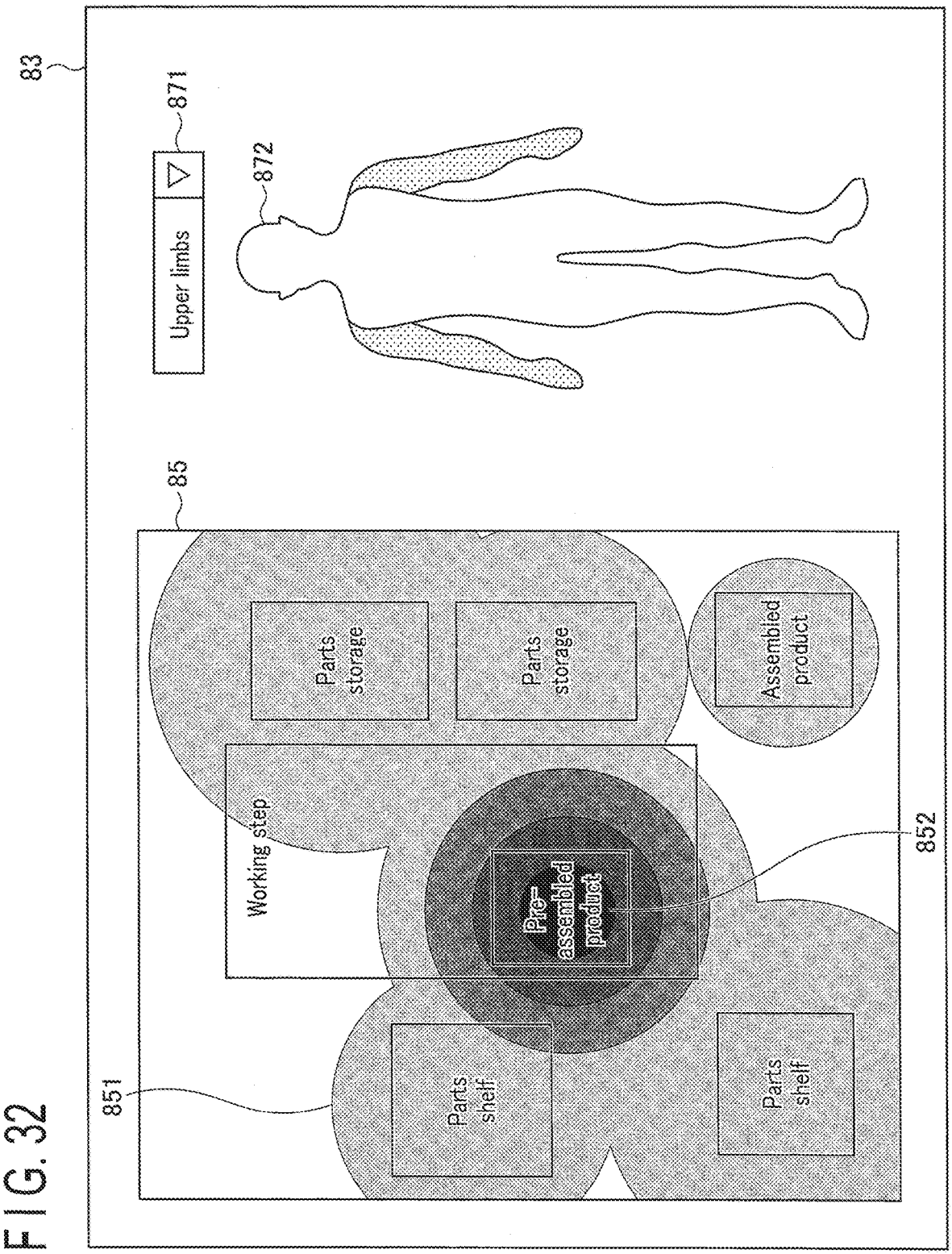
FIG. 32 is a diagram illustrating a second specific example of display data obtained according to the second embodiment and including a human body diagram showing a specific body part and a sketch showing load values related to the specific body dart and displayed in correspondence to a plurality of work targets.

FIG. 32 is a diagram illustrating a second specific example of display data 83 obtained according to the second embodiment and including a human body diagram 872 showing a specific body part and a sketch 85 showing load values related to the specific body part and displayed in correspondence to a plurality of work targets. The display data 83 is a GUI including the sketch 85, a pull-down menu 871 and the human body diagram 872.

When the user selects, for example, the body part "upper limbs" from the pull-down menu 871, the upper limb regions are colored, in the human body diagram 872, and the load value map 851 regarding the "upper limbs" is superimposed on the sketch 85. At this time, the load area 852 corresponding to the load value level LV4 is displayed on the pre-assembly product. Therefore, the user who looks at the sketch 83 can recognize that the work performed for the pre-assembly product imposes a heavy load on the "upper limbs" of the worker.

Figure 33:
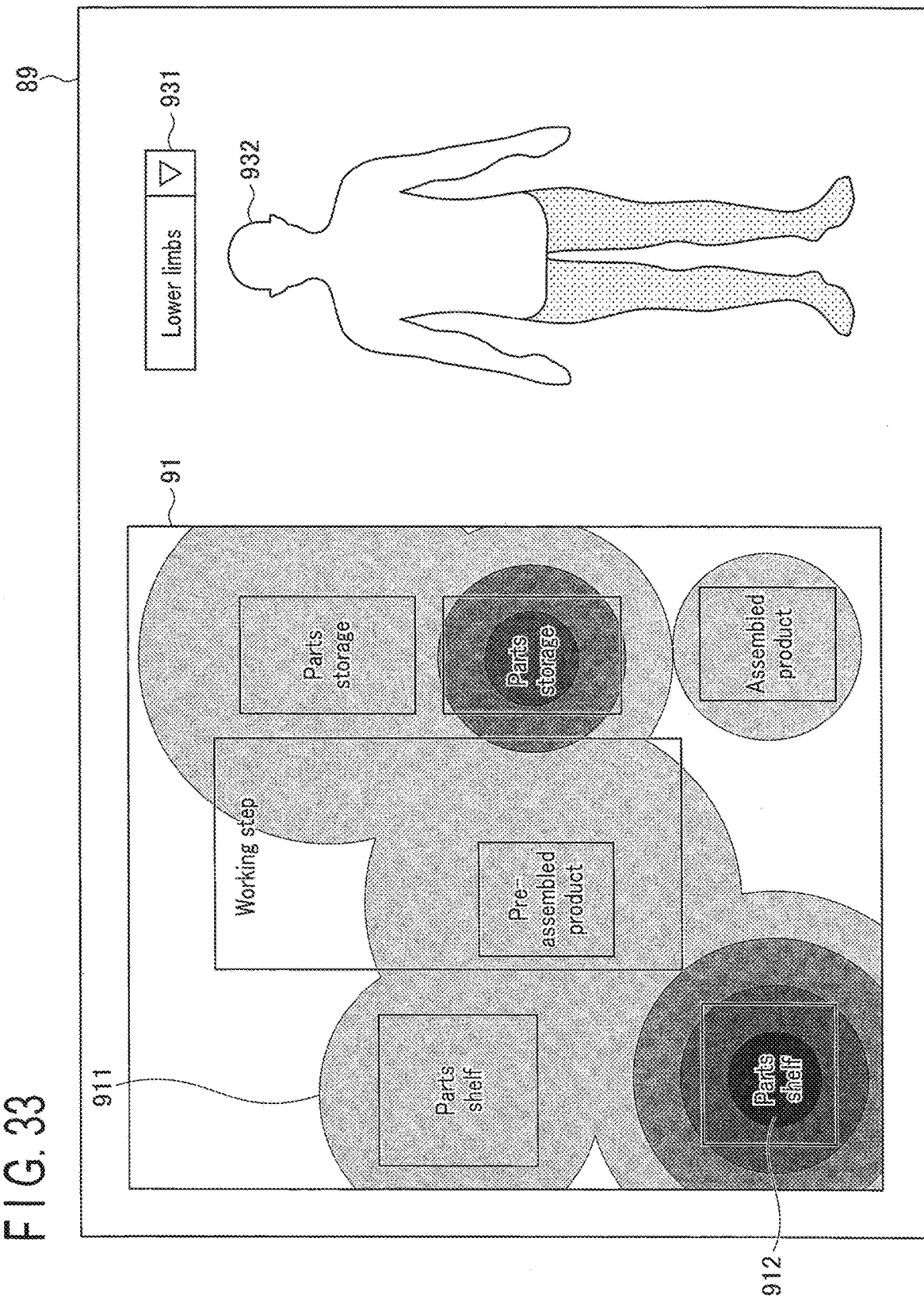
FIG. 33 is a diagram illustrating a third specific example of display data obtained according to the second embodiment and including a human body diagram showing a specific body part and a sketch showing load values related to the specific body part and displayed in correspondence to a plurality of work targets.

FIG. 33 is a diagram illustrating a third specific example of display data 89 obtained according to the second embodiment and including a human body diagram 932 showing a specific body part and a sketch 91 showing load values related to the specific body part and displayed in correspondence to a plurality of work targets. The display data 89 is a GUI including the sketch 91, a pull-down menu 931 and the human body diagram 932.

When the user selects, for example, the body part "lower limbs" from the pull-down menu 931, the lower limb regions are colored in the human body diagram 932, and the load value map 911 regarding the "lower limbs" is superimposed on the sketch 91. At this time, the load area 912 corresponding to the load value level LV4 is displayed in the parts shelf (corresponding to the parts shelf 477 in the sketch 47 shown in FIG. 21) located at the lower left. Therefore, the user who looks at the display data 89 can recognize that the work performed for the parts shelf located at the lower left imposes a heavy load on the "lower limbs" of the worker.

In FIGS. 31 to 33, the display data is data including a human body diagram showing a specific body part and a sketch showing load values related to the specific body part in correspondence to a plurality of work targets, but the display data is not limited to this. For example, the display data may be data including a sketch diagram showing a specific work target and a human body diagram in which the accumulated load values related to the specific work target are displayed in correspondence to a plurality of body parts of the worker.

Figure 34:
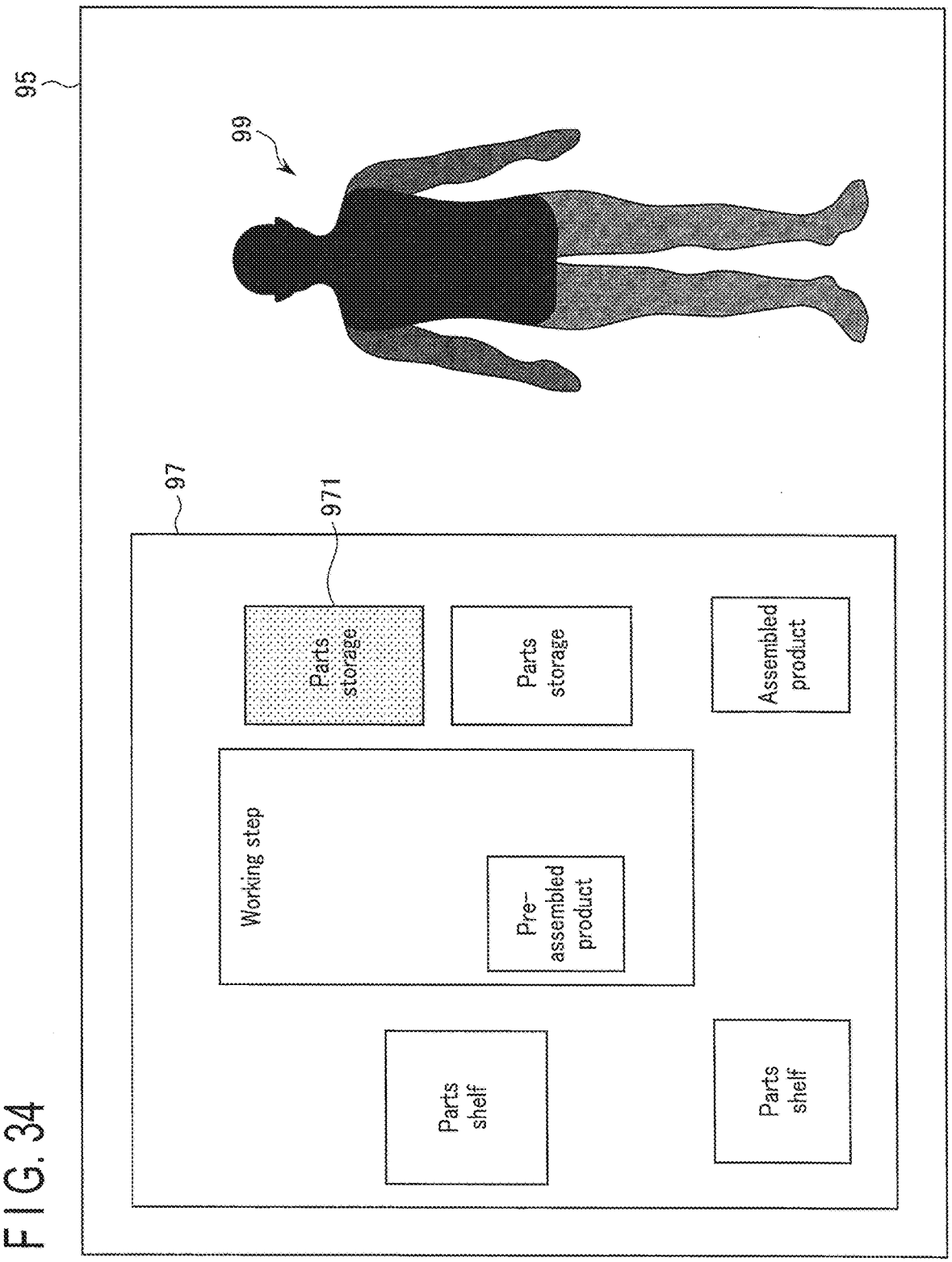
FIG. 34 is a diagram illustrating display data including a sketch showing a specific work target and a human body diagram in which accumulated load values are displayed in correspondence to a plurality of body parts.

FIG. 34 is a diagram illustrating display data 95 including a sketch 97 showing a specific work target and a human body diagram 99 in which accumulated load values are displayed in correspondence to a plurality of body parts. The display data 95 is a GUI including the sketch 97 and the human body diagram 99. For example, when the user selects the parts storage 971 located at the upper right from the sketch 97, the region of the parts storage 971 is colored in the sketch 97, and in the human body diagram 99, the body part regions are color-coded according to the accumulated load values corresponding to them. Therefore, the user who looks at the display data 95 can confirm the load values corresponding to the body parts of the worker in relation to a specific work target.

The display data according to the second embodiment is not limited to the above-mentioned data. For example, the display data may be represented by a three-dimensional sketch. At this time, the display data generation unit 124A generates display data in which a load value map is superimposed on the three-dimensional sketch. In this case, the load value map is superimposed, for example, on the surface of the three-dimensional model of the work targets.

In addition, the display data may be generated by processing the video data. At this time, the display data generation unit 124A superimposes a load value map on the work targets on the video data. Further, numerical values included in the statistical data, figures corresponding to the numerical values, and a table or a graph that is based on the statistical data, may be superimposed such that they are shown on the work targets of the video data or in the neighborhood thereof.

(Step ST230)

After the display data is generated, the processing unit 120A outputs the display data that is based on the work values and work target to the output device 400A. After the processing of step ST230, the work estimation program is ended.

Where the video data is acquired in real time, the process flow may return to step ST210 after the processing of step ST230, and the subsequent processes may be repeated. The work estimation program may be ended in response to an instruction by the user.

As described above, the work estimation apparatus 100A according to the second embodiment acquires video data relating to a predetermined area, calculates a work value of the work performed by the worker included in the video data, based on the acquired video data, and displays the work value. This work value may include, for example, a load value that represents the physical load which the work imposes on the worker. Further, the work estimation apparatus 100A according to the second embodiment may estimate a working posture of the worker, may specify a posture of a body part of the worker, and may superimpose a map representing a load value on a human body diagram regarded as a worker. Still further, the work estimation apparatus 100A according to the second embodiment may estimate a work target of the work performed by the worker, and superimpose a map showing the load value on the sketch showing the estimated work target.

Therefore, the work estimation apparatus 100A according to the second embodiment uses an image and enables the work state of a worker to be visually recognized at a lower introduction cost than a conventional work value estimation using a sensor. In addition, the work estimation apparatus 100A according to the second embodiment can visualize the work load related to a body part of the worker in relation to the work target, and can help improve the working environment from the viewpoint of safety and health.

Figure 35:
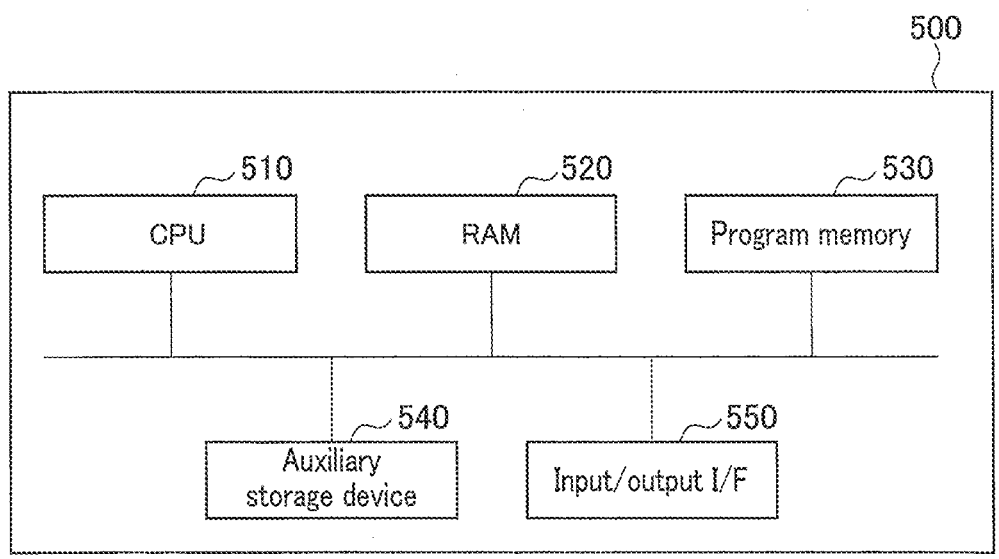
FIG. 35 is a block diagram illustrating a hardware configuration of a computer according to one embodiment.

FIG. 35 is a block diagram illustrating a hardware configuration of a computer 500 according to one embodiment. The computer 500 includes a CPU (Central Processing Unit) 510, a RAM (Random Access Memory) 520, a program memory 530, an auxiliary storage device 540 and an input/output interface (input/output I/F) 550. These elements are provided as hardware. The CPU 510 communicates with the RAM 520, the program memory 530, the auxiliary storage device 540 and the input/output interface 550 via a bus.

The CPU 510 is an example of a general-purpose processor. The RAM 520 is used as a working memory by the CPU 510. The RAM 520 includes a volatile memory such as an SDRAM (Synchronous Dynamic Random Access Memory). The program memory 530 stores various programs including a signal processing program. As the program memory 530, for example, a ROM (Read Only Memory), a portion of the auxiliary storage device 540, or a combination of these is used. The auxiliary storage device 540 stores data in a nonvolatile manner. The auxiliary storage device 540 includes a nonvolatile memory such as an HDD or an SSD.

The input/output interface 550 is an interface for coupling to another device. The input/output interface 550 is used, for example, for coupling to the photographing device, storage device and output device shown in FIGS. 1 and 16.

Each of the programs stored in the program memory 530 includes computer executable instructions. When the program (computer executable instruction) is executed by the CPU 510, it causes the CPU 510 to execute a predetermined process. For example, when the work estimation program is executed by the CPU 510, the CPU 510 executes a series of processes described in relation to the acquisition unit, the processing unit and the display control unit.

The program may be provided to the computer 500 in a state of being stored in a computer-readable storage medium. In this case, for example, the computer 500 further includes a drive (not shown) that reads data from the storage medium, and acquires the program from the storage medium. Examples of storage media include a magnetic disk, optical disks (CD-ROM, CD-R, DVD-ROM, DVD-R, etc.), magneto-optical disks (MO, etc.) and a semiconductor memory. The program may be stored in a server on a communication network such that the computer 500 can download the program from the server using the input/output interface 550.

The processes described in connection with the embodiments are not limited to those which a general-purpose hardware processor such as a CPU 510 executes according to a program, and may be performed by a dedicated hardware processor such as an ASIC (Application Specific Integrated Circuit). The term processing circuit (processing unit) includes at least one general-purpose hardware processor, at least one dedicated hardware processor, or a combination of at least one general-purpose hardware processor and at least one dedicated hardware processor. In the example shown in FIG. 35, the CPU 510, the RAM 520 and the program memory 530 correspond to the processing circuit.

Therefore, according to each of the above embodiments, the work of a worker can be estimated without imposing a burden on the worker.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A work estimation apparatus comprising processing circuitry configured to:
   acquire video data on a predetermined area;
   calculate a work value related to work performed by a worker included in the video data, based on the video data, wherein the work value includes a load value that represents a physical load which the work imposes on the worker;
   calculate a posture feature amount of the worker by applying a skeleton estimation model to the video data;
   estimate a working posture of the worker, based on the posture feature amount;
   calculate the load value, based on the working posture;
   estimate a work target of the work performed by the worker from among one or more work target candidates, based on a sketch of the predetermined area in which the working posture and one or more work target candidates are associated with each other; and
   display the work value.

2. The apparatus according to claim 1, wherein the processing circuitry is further configured to cause a storage device to store the work value and video data information on the video data in association with each other.

3. The apparatus according to claim 1, wherein the processing circuitry is further configured to:
   specify a plurality of body parts of the worker from the posture feature amount; and
   estimate the working posture by specifying a posture of each of the plurality of body parts by using a table in which the plurality of body parts and a plurality of postures corresponding to the plurality of body parts are associated with each other.

4. The apparatus according to claim 1, wherein the processing circuitry is further configured to calculate the load value by use of a table in which a plurality of working postures and a plurality of load values are associated with each other.

5. The apparatus according to claim 1, wherein the work value includes a plurality of load values corresponding to a plurality of body parts of the worker in relation to the work, and the processing circuitry is further configured to:
identify the plurality of body parts from the posture feature amount;
identify the posture of each of the plurality of body parts by use of a table in which the plurality of body parts and a plurality of postures corresponding to the plurality of body parts are associated with each other; and
calculate the plurality of load values, based on the postures of the plurality of body parts.

6. The apparatus according to claim 5, wherein the processing circuitry is further configured to:
superimpose a map representing load values of the plurality of body parts on a human body diagram regarded as the worker; and
display the human body diagram on which the map is superimposed.

7. The apparatus according to claim 1, wherein the work value includes a plurality of load values expressed in time series,
the processing circuitry is further configured to:
calculate the plurality of load values expressed in time series; and
generate statistical data on load values of the worker, based on the plurality of load values expressed in time series.

8. The apparatus according to claim 7, wherein the processing circuitry is further configured to generate, as the statistical data, one of sums of the load values expressed in time series, an average value of the sums, a weighted average value of the sums, weighted sums of the plurality of load values expressed in time series, an average value of the weighted sums, and a weighted average value of the weighted sums.

9. The apparatus according to claim 1, wherein the processing circuitry is further configured to present the work target and the load value in association with each other.

10. The apparatus according to claim 9, wherein the processing circuitry is further configured to:
superimpose a map representing the load values on the work target on the sketch; and
display the sketch on which the map is superimposed.

11. The apparatus according to claim 1, wherein the processing circuitry is further configured to present the work target and the load values corresponding to a plurality of body parts of the worker in association with each other.

12. The apparatus according to claim 11, wherein the processing circuitry is further configured to:
superimpose a map representing load values of a plurality of body parts of the worker on the work target on the sketch; and
display the sketch on which the map is superimposed.

13. The apparatus according to claim 1, wherein the work value includes a plurality of load values expressed in time series, and
the processing circuitry is further configured to:
calculate the plurality of load values expressed in time series;

estimate a plurality of work targets, based on the video data, the sketch, and the working posture; and
generate statistical data regarding the load value of the worker for each work target of the plurality of work targets, based on the plurality of load values expressed in time series and the plurality of work targets.

14. The apparatus according to claim 1, wherein the work value includes a plurality of load values expressed in time series,
the sketch is associated with a plurality of work target items in advance, and
the processing circuitry is further configured to:
calculate the plurality of load values expressed in time series, based on the video data; and
generate statistical data regarding the load value of the worker for each of the plurality of work target items.

15. The apparatus according to claim 1, wherein the processing circuitry is further configured to cause a storage device to store the work value, the work target, and video data information on the video data in association with each other.

16. A work estimation method comprising:
acquiring video data on a predetermined area,
calculating a work value related to work performed by a worker included in the video data, based on the video data, wherein the work value includes a load value that represents a physical load which the work imposes on the worker,
calculating a posture feature amount of the worker by applying a skeleton estimation model to the video data,
estimating a working posture of the worker, based on the posture feature amount,
calculating the load value, based on the working posture;
estimating a work target of the work performed by the worker from among one or more work target candidates, based on a sketch of the predetermined area in which the working posture and one or more work target candidates are associated with each other, and
displaying the work value.

17. A non-transitory computer-readable storage medium storing a program for causing a computer to execute processing comprising:
acquiring video data on a predetermined area;
calculating a work value related to work performed by a worker included in the video data, based on the video data, wherein the work value includes a load value that represents a physical load which the work imposes on the worker;
calculating a posture feature amount of the worker by applying a skeleton estimation model to the video data;
estimating a working posture of the worker, based on the posture feature amount;
calculating the load value, based on the working posture;
estimating a work target of the work performed by the worker from among one or more work target candidates, based on a sketch of the predetermined area in which the working posture and one or more work target candidates are associated with each other; and
displaying the work value.

18. The apparatus according to claim 1, wherein the processing circuitry is further configured to:
associate the work value with the work target over a duration of time; and display the work value over superimposed on the work target.

\* \* \* \* \*